(12) United States Patent
Liu et al.

(10) Patent No.: US 12,426,123 B2
(45) Date of Patent: Sep. 23, 2025

(54) PROVIDE DATA TRANSMISSION TO AVOID LARGE TRANSMISSION DELAY

(71) Applicants: CHINA MOBILE COMMUNICATION CO., LTD RESEARCH INSTITUTE, Beijing (CN); CHINA MOBILE COMMUNICATIONS GROUP CO., LTD., Beijing (CN)

(72) Inventors: Liang Liu, Beijing (CN); Ningyu Chen, Beijing (CN); Xingyu Han, Beijing (CN); Nan Hu, Beijing (CN)

(73) Assignees: CHINA MOBILE COMMUNICATION CO., LTD RESEARCH INSTITUTE, Beijing (CN); CHINA MOBILE COMMUNICATIONS GROUP CO., LTD., Beijing (CN)

(*) Notice: Subject to any disclaimer, the term of this patent is extended or adjusted under 35 U.S.C. 154(b) by 379 days.

(21) Appl. No.: 18/040,107

(22) PCT Filed: Jul. 30, 2021

(86) PCT No.: PCT/CN2021/109710
§ 371 (c)(1),
(2) Date: Jan. 31, 2023

(87) PCT Pub. No.: WO2022/022699
PCT Pub. Date: Feb. 3, 2022

(65) Prior Publication Data
US 2023/0319941 A1 Oct. 5, 2023

(30) Foreign Application Priority Data
Jul. 31, 2020 (CN) .......................... 202010757105.7

(51) Int. Cl.
H04W 76/20 (2018.01)
H04W 76/19 (2018.01)
(Continued)

(52) U.S. Cl.
CPC ........... *H04W 76/20* (2018.02); *H04W 76/19* (2018.02); *H04W 76/30* (2018.02); *H04W 74/0833* (2013.01); *H04W 74/0836* (2024.01)

(58) Field of Classification Search
CPC ..... H04W 76/20; H04W 76/19; H04W 76/30; H04W 74/0833
See application file for complete search history.

(56) References Cited

U.S. PATENT DOCUMENTS

2018/0343600 A1  11/2018  Ma
2019/0380128 A1* 12/2019  Park ...................... H04W 72/21
(Continued)

FOREIGN PATENT DOCUMENTS

CN       101868934 A    10/2010
CN       106793170 A     5/2017
(Continued)

OTHER PUBLICATIONS

NPL Document, "MAC sub-header formats" Berlin, Germany, Aug. 21-25, 2017 (Year: 2017).*
(Continued)

*Primary Examiner* — Mewale A Ambaye
(74) *Attorney, Agent, or Firm* — Syncoda LLC; Feng Ma

(57) ABSTRACT

A data transmission method includes: a terminal in an RRC inactive state transmits a data packet and an RRC resume request to a first base station or the CU of the first base
(Continued)

station or the DU of the first base station; receive an RRC release message transmitted by the first base station or the CU of the first base station or the DU of the first base station.

14 Claims, 17 Drawing Sheets

(51) Int. Cl.
*H04W 76/30* (2018.01)
*H04W 74/0833* (2024.01)
*H04W 74/0836* (2024.01)

(56) References Cited

U.S. PATENT DOCUMENTS

| | | | |
|---|---|---|---|
| 2019/0380154 A1 | 12/2019 | Wei | |
| 2020/0068581 A1 | 2/2020 | Xu | |
| 2020/0092939 A1* | 3/2020 | Kim | H04W 76/19 |
| 2020/0196349 A1 | 6/2020 | He et al. | |
| 2020/0214070 A1 | 7/2020 | Ingale | |
| 2020/0314732 A1* | 10/2020 | Park | H04L 5/0055 |
| 2020/0350972 A1* | 11/2020 | Yi | H04B 7/088 |
| 2020/0351066 A1* | 11/2020 | Cirik | H04W 76/27 |
| 2021/0160949 A1 | 5/2021 | Kim | |
| 2022/0117006 A1* | 4/2022 | Godin | H04W 76/25 |
| 2023/0209635 A1 | 6/2023 | Kim | |

FOREIGN PATENT DOCUMENTS

| | | | | |
|---|---|---|---|---|
| CN | 109756891 A | 5/2019 | | |
| CN | 110235513 A | 9/2019 | | |
| CN | 110636565 A | 12/2019 | | |
| CN | 110650548 A | 1/2020 | | |
| CN | 113271687 A | 8/2021 | | |
| EP | 3813428 A1 | 4/2021 | | |
| WO | 2018151546 A1 | 8/2018 | | |
| WO | WO-2020036460 A1 * | 2/2020 | | H04W 76/11 |

OTHER PUBLICATIONS

NPL Document, "Consideration of MsgA contents and size" Xi'an, China, Apr. 8-12, 2019 (Year: 2019).*
Intel Corporation: "Consideration of MsgA contents and size", 3GPP Draft; R2-1904438 Intel MSGA Size_V03, 3rd Generation Partnership Project (3GPP), Mobile Competence Centre; 650, Route Des Lucioles; F-06921 Sophia-Antipolis Cedex; France vol. RAN WG2, No. Xi' an, China; Apr. 8, 2019-Apr. 126, 2019 Apr. 2019 (Apr. 6, 2019), XP051701740, paragraph [03.2], figure 5. 6 pages.
Nokia et al: "MAC sub-header formats", 3GPP Draft; R2-1708763 MAC Sub-Header Formats_V1, 3rd Generation Partnership Project (3GPP), Mobile Competence Centre; 650, Route Des Lucioles; F-06921 Sophia-Antipolis Cedex; France vol. RAN WG2, No. Berlin, Germany; Aug. 21, 2017-Aug. 2520, 2017 Aug. 2017 (Aug. 20, 2017), XP051318568, paragraph [0003]. 9 pages.
Supplementary European Search Report in the European application No. 21849926.7, mailed on Dec. 8, 2023. 12 pages.
3GPP TSG-RAN WG2 #97 Tdoc R2-1700890, Athens, Greece, Feb. 13-17, 2017, Agenda Item: 10.2.2.2, Source: Ericsson, Title: Details of solution B for small data transmission in RRC_Inactive, Document for: Discussion, Decision. the whole document. 7 pages.
3GPP TSG-RAN WG2 #99bis Tdoc R2-1710827, Prague, Czech Republic, Oct. 9-13, 2017 (Revision of R2-1707843), Agenda Item: 10.4.1.7.2, Source: Ericsson, Title: RAN Area update in RRC_Inactive, Document for: Discussion, Decision. the whole document. 8 pages.
Ericsson. "Report of email discussion: [96#31][NR] UL data in inactive solution B", 3GPP TSG-RAN WG2 NR Adhoc Meeting R2-1700626, Jan. 18, 2017 (Jan. 18, 2017), section 4, and figure 3.
International Search Report in the international application No. PCT/CN2021/109710, mailed on Sep. 26, 2021.
Written Opinion of the International Search Authority in the international application No. PCT/CN2021/109710, mailed on Sep. 26, 2021.

* cited by examiner

PROVIDE DATA TRANSMISSION TO AVOID LARGE TRANSMISSION DELAY

CROSS-REFERENCE TO RELATED APPLICATIONS

This application is a National Stage of International Application No. PCT/CN2021/109710 filed on Jul. 30, 2021, which claims priority to Chinese Patent Application No. 202010757105.7, filed on Jul. 31, 2020. The disclosures of the above-referenced applications are hereby incorporated by reference in their entirety.

TECHNICAL FIELD

The present disclosure relates to the technical field of communication, and in particular to a data transmission method, a User Equipment and a network side device.

BACKGROUND

At present, in addition to a Radio Resource Control (RRC) idle state and an RRC connected state, the state of a terminal further includes an RRC inactive (RRC inactive) state. The RRC inactive state may enable a User Equipment (UE) to enter the RRC connected state quickly and complete establishment of a Protocol Data Unit (PDU) session under a condition of saving resources and saving energy as much as possible, thereby satisfying a requirement of an ultra-reliable low-delay scenario.

However, if the terminal in the RRC inactive state needs to send data, the terminal must first perform connection resume and enter the RRC connected state to send the data. In a small packet transmission scenario, this manner may increase a transmission delay.

SUMMARY

Embodiments of the present disclosure provide a data transmission method, a User Equipment (UE) and a network side device, so as to solve the problem of large transmission delay of a transmission mode in the related art.

According to a first aspect, embodiments of the present disclosure provide a data transmission method applied to a User Equipment (UE) in a Radio Resource Control (RRC) inactive state. The data transmission method includes the following operations.

Data and an RRC resume request message are sent to a first base station or a centralized unit (CU) of the first base station or a distributed unit (DU) of the first base station.

An RRC release message from the first base station or the CU of the first base station or the DU of the first base station is received.

According to a second aspect, embodiments of the present disclosure provide a data transmission method applied to a first base station or a CU of the first base station or a DU of the first base station. The data transmission method includes the following operations.

Data and an RRC resume request message from a UE in an RRC inactive state are received.

An RRC release message is sent to the UE.

According to a third aspect, embodiments of the present disclosure provide a data transmission method applied to a second base station. The data transmission method includes the following operations.

A retrieval UE context request message from a first base station or a CU of the first base station is received.

A retrieval UE context failure message is sent to the first base station or the CU of the first base station.

Data is sent to a core network.

According to a fourth aspect, embodiments of the present disclosure provide a data transmission method applied to a DU of a first base station. The data transmission method includes the following operations.

Data and an RRC resume request message sent by a UE in an RRC inactive state are received.

The data and the RRC resume request message are sent to a CU of the first base station.

An RRC release message from the CU of the first base station is received.

The RRC release message is sent to the UE.

According to a fifth aspect, embodiments of the present disclosure provide a UE. The UE is in an RRC inactive state and includes a sending module and a receiving module.

The sending module is configured to send data and an RRC resume request message to a first base station or a CU of the first base station or a UE of the first base station.

The receiving module is configured to receive an RRC release message from the first base station or the CU of the first base station or the DU of the first base station.

According to a sixth aspect, embodiments of the present disclosure provide a UE. The UE is in an RRC inactive state and includes a processor and a transceiver.

The transceiver is configured to send data and an RRC resume request message to a first base station or a CU of the first base station or a UE of the first base station and receive an RRC release message from the first base station or the CU of the first base station or the DU of the first base station.

According to a seventh aspect, embodiments of the present disclosure provide a network side device. The network side device is a first base station or a CU of the first base station or a DU of the first base station and includes a receiving module and a sending module.

The receiving module is configured to receive data and an RRC resume request message from a UE in an RRC inactive state.

The sending module is configured to send an RRC release message to the UE.

According to an eighth aspect, embodiments of the present disclosure provide a network side device. The network side device is a first base station or a CU of the first base station or a DU of the first base station and includes a processor and a transceiver.

The transceiver is configured to receive data and an RRC resume request message from a UE in an RRC inactive state and send an RRC release message to the UE.

According to a ninth aspect, the embodiments of the present disclosure provide a network side device. The network side device is a second base station and includes a first receiving module, a first sending module and a second sending module.

The first receiving module is configured to receive a retrieval UE context request message from a first base station or a CU of the first base station.

The first sending module is configured to send a retrieval UE context failure message to the first base station or the CU of the first base station.

The second sending module is configured to send data to a core network.

According to a tenth aspect, embodiments of the present disclosure provide a network side device. The network side device is a second base station and includes a processor and a transceiver.

The transceiver is configured to receive a retrieval UE context request message from a first base station or a CU of the first base station, send a retrieval UE context failure message to the first base station or the CU of the first base station, and send data to a core network.

According to an eleventh aspect, embodiments of the present disclosure provide a network side device. The network side device is a DU of a first base station and includes a first receiving module, a first sending module, a second receiving module and a second sending module.

The first receiving module is configured to receive data and an RRC resume request message from a UE in an RRC inactive state.

The first sending module is configured to send the data and the RRC resume request message to a CU of the first base station.

The second receiving module is configured to receive an RRC release message from the CU of the first base station.

The second sending module is configured to send the RRC release message to the UE.

According to a twelfth aspect, the embodiments of the present disclosure provide a network side device. The network side device is a DU of a first base station and includes a processor and a transceiver.

The transceiver is configured to receive data and an RRC resume request message from a UE in an RRC inactive state, send the data and the RRC resume request message to a CU of the first base station, receive an RRC release message from the CU of the first base station, and send the RRC release message to the UE.

According to a thirteenth aspect, embodiments of the present disclosure provide a UE including a processor, a memory and a computer program stored on the memory and being executable on the processor. The computer program, when executed by the processor, implements the operations of the data transmission method of the first aspect.

According to a fourteenth aspect, embodiments of the present disclosure provide a network side device including a processor, a memory and a computer program stored on the memory and being executable on the processor. The computer program, when executed by the processor, implements the operations of the data transmission method of the second aspect, or the computer program, when executed by the processor, implements the operations of the data transmission method of the third aspect, or the computer program, when executed by the processor, implements the operations of the data transmission method of the fourth aspect.

According to a fifteenth aspect, embodiments of the present disclosure provide a computer readable storage medium. A computer program is stored on the computer readable storage medium. The computer program, when executed by the processor, implements the operations of the data transmission method of the first aspect of claims, or the computer program, when executed by the processor, implements the operations of the data transmission method of the second aspect, or the computer program, when executed by the processor, implements the operations of the data transmission method of the third aspect, or the computer program, when executed by the processor, implements the operations of the data transmission method of the fourth aspect.

In the embodiments of the present disclosure, a UE in an RRC inactive state sends data and an RRC resume request message to a first base station or a CU of the first base station or a DU of the first base station and receives an RRC release message from the first base station or the CU of the first base station or the DU of the first base station. Timing of the data transmission is advanced so that transmission delay is reduced and process of the UE returning to the RRC inactive state can be accelerated, thereby saving power consumption of the UE.

BRIEF DESCRIPTION OF THE DRAWINGS

In order to describe the technical solutions in the embodiments of the present disclosure more clearly, the drawings required to be used in the description of the embodiments of the present disclosure would be briefly introduced below. It is apparent that the drawings described below are only some embodiments of the present disclosure, and other drawings may further be obtained by those of ordinary skill in the art according to the drawings without creative efforts.

DETAILED DESCRIPTION

Technical solutions in the embodiments of the present disclosure will be clearly and completely described below in combination with the drawings in the embodiments of the present disclosure. It is apparent that the described embodiments are only a part rather than all of embodiments of the present disclosure. All other embodiments obtained by those of ordinary skill in the art based on the embodiments of the present disclosure without creative efforts shall fall within the protection scope of the present disclosure.

Figure 1:
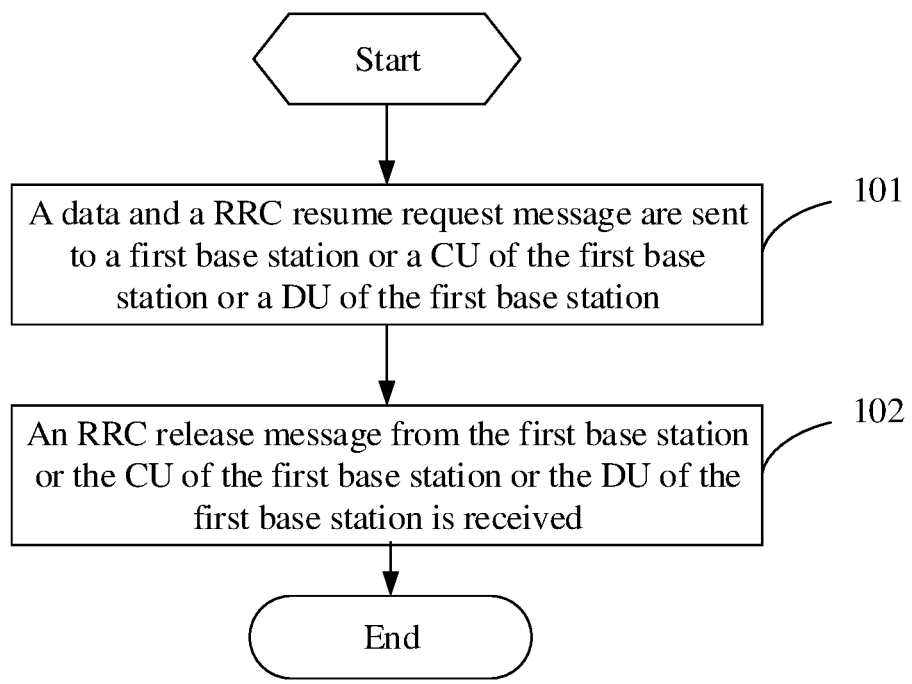
FIG. 1 is a first flowchart of a data transmission method according to an embodiment of the present disclosure.

Referring to FIG. 1, FIG. 1 is a flowchart of a data transmission method according to an embodiment of the present disclosure, and is applied to a UE in an RRC inactive state. As illustrated in FIG. 1, the data transmission method includes the following operations.

At block 101, data and an RRC resume request message are sent to a first base station or a CU of the first base station or a DU of the first base station.

In a specific embodiment of the present disclosure, the data may be application data of various applications, such as data of an instant messaging software, a heartbeat packet of an application such as mail, and data of a smart wearable device and a sensor. The data and the RRC resume request message may be sent to the first base station or the CU of the first base station or the DU of the first base station in the same data transmission.

For a four-step Random Access (RA) procedure, the UE sends a preamble to the first base station or the CU of the first base station or the DU of the first base station at a Physical Random Access Channel (PRACH) occasion. After detecting the preamble, the first base station or the CU of the first base station or the DU of the first base station sends an RA response message to the UE, which is scrambled by using a RA Radio Network Temporary Identity (RNTI) corresponding to the PRACH occasion for sending the preamble.

The UE receives the RA response message from the first base station or the CU of the first base station or the DU of the first base station. If it is determined that the RA response message is sent to the UE, for example, Random Access preamble identifiers (RAPID) are consistent, the UE sends the data and the RRC resume request message to the first base station or the CU of the first base station or the DU of the first base station.

For a two-step RA procedure, the operation of the S101 includes that the UE sends the preamble to the first base station or the CU of the first base station or the DU of the first base station at the PRACH occasion, and sends the data and the RRC resume request message to the first base station or the CU of the first base station or the DU of the first base station on a Physical Uplink Shared Channel (PUSCH).

At block 102, an RRC release message from the first base station or the CU of the first base station or the DU of the first base station is received.

After that the UE receives the RRC release message, an RRC connection is released and the UE enters the RRC inactive state, which may save the power consumption of the UE.

Figure 2:
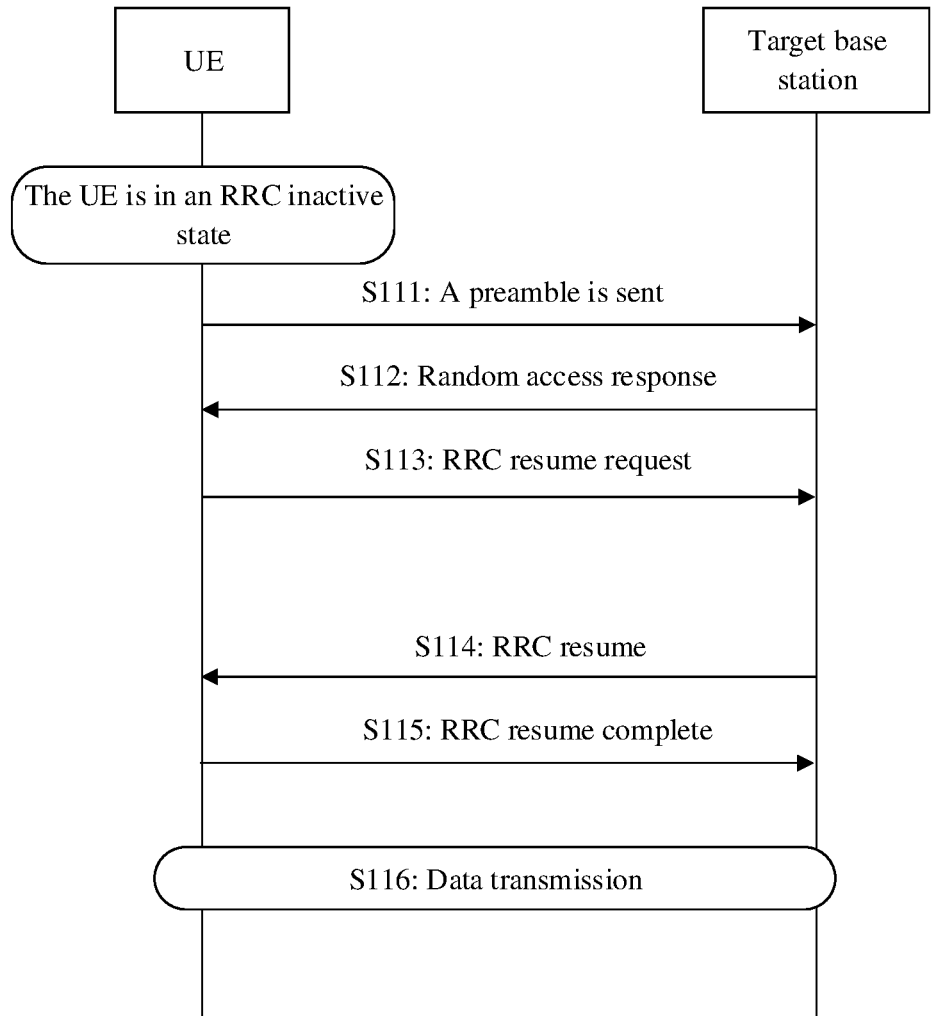
FIG. 2 is a flowchart of data transmission between a UE and a target base station in the related art.

In the related art related to the four-step access procedure, if the UE in the RRC inactive state needs to send data, operations illustrated in FIG. 2 are required. In FIG. 2, a target base station is the first base station or the CU of the first base station or the DU of the first base station.

At S111, the UE sends the preamble to the target base station.

At S112, the UE receives the RA response message from the target base station.

At S113, the UE sends the RRC resume request message to the target base station.

At S114, the UE receives an RRC resume message from the target base station.

At S115, the UE sends an RRC resume complete message to the target base station.

At S116, the UE sends the data to the target base station.

Compared with the process that the UE transmits the data illustrated in FIG. 2, the data transmission method in the specific embodiments of the present disclosure does not need to start transmitting the data after the RRC resume is completed, but may transmit the data after the RA response message is received. That is, timing of data transmission is advanced, and the transmission delay is reduced. Meanwhile, compared with the related art, the specific embodiments of the present disclosure can accelerate the process of the UE returning to the RRC inactive state, thereby saving the power consumption of the UE.

Similarly, for the two-step RA procedure, the data transmission delay can be reduced and the power consumption of the UE can be saved as well.

In the embodiment, the UE in the RRC inactive state sends the data and the RRC resume request message to the first base station or the CU of the first base station or the DU of the first base station and receives the RRC release message from the first base station or the CU of the first base station or the DU of the first base station. The timing of the data transmission is advanced so that transmission delay is reduced and process of the UE returning to the RRC inactive state can be accelerated, thereby saving power consumption of the UE.

Further, the RRC resume request message is an RRC resume request message in the four-step random access procedure or an RRC resume request message carried by a message A (MSG A) in the two-step RA procedure.

Further, the data is multiplexed or concatenated with the RRC resume request message.

Further, before the operation of S101 that the data and the RRC resume request message are sent to the first base station or the CU of the first base station or the DU of the first base station, the following operations are further included.

The data is taken as a first MAC Service Data Unit (SDU) and directly encapsulated to a first MAC PDU.

Or,

A second MAC SDU generated through a preprocessing using the data is encapsulated to a second MAC PDU.

That is, the data is encapsulated to the first MAC PDU or the second MAC PDU. The preprocessing includes at least one of a resume processing, an encryption processing or a segmentation processing of a signaling bearer and a data bearer.

Specifically, after the UE receives the RA response message from the first base station or the CU of the first base station or the DU of the first base station, if it is determined that the RA response message is sent to the UE, for example, the RAPIDs are consistent, an Identity Document (ID) of the UE and a Uplink (UL) data are sent on a UL Grant resource.

Figure 3A:
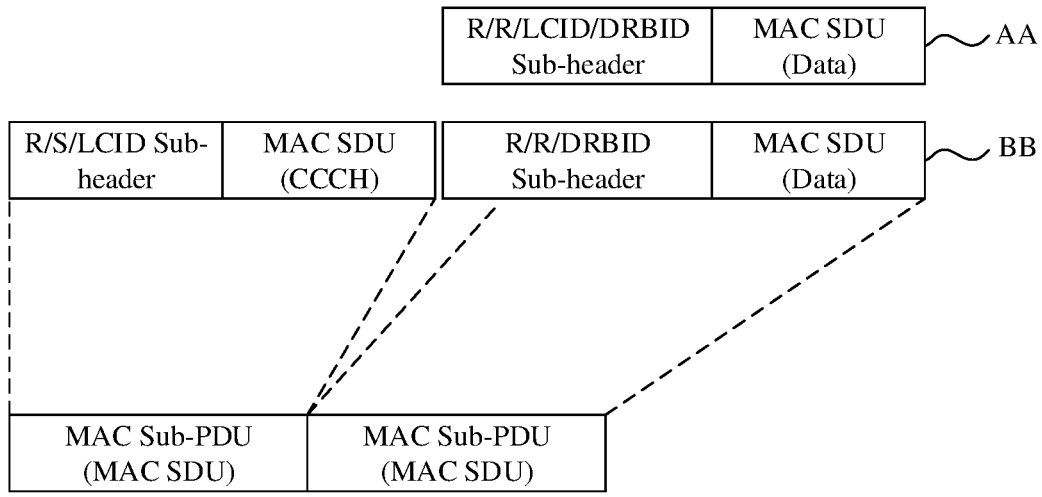
FIG. 3A and FIG. 3B are diagram of field composition of a Media Access Control (MAC) Protocol Data Unit (PDU) according to embodiments of the present disclosure.

At this time, if the UE does not activate a configuration such as a Signal Radio Bearer (SRB) and a Data Radio Bearer (DRB), the UE directly encapsulates an Internet Protocol (IP) data (i.e. the data) as the first MAC SDU into the first MAC PDU. MAC sub-header information (i.e. sub-header) is added to the data to form an MAC sub-PDU (i.e. sub-PDU), and then put after an MAC sub-PDU containing a Common Control Channel (CCCH) (i.e. the RRC resume request message) or a Dedicated Control Channel (DCCH). The sub-header of the MAC sub-PDU carrying the CCCH or DCCH contains an indication of whether other MAC PDUs are included. The specific MAC PDU is illustrated in FIG. 3A.

An S domain of a first sub-header indicates whether there are subsequent MAC sub-PDUs, and a sub-header of a second MAC sub-PDU includes two implementation methods.

First implementation method (as illustrated by reference number AA in FIG. 3A): the sub-header contains a dedicated Logical Channel Identification (LCID) corresponding to the data. The dedicated LCID is used by the base station (which may be understood as the first base station or the CU of the first base station or the DU of the first base station) to identify that the data is IP data. The sub-header also contains DRB ID information corresponding to the data. The DRB ID information is used by the base station to know which bearer of the UE the data corresponds to, so that the base station can accurately place the data in an appropriate User Plane of GPRS Tunneling Protocol (GTP-U) tunnel to send the data to a core network.

Second implementation method (as illustrated by reference number BB in FIG. 3A): the sub-header contains the DRB ID information corresponding to the data. The base station identifies that the data is IP data according to the DRB ID information and meanwhile know which bearer of the UE the data corresponds to, so that the base station can accurately place the data in the appropriate GTP-U tunnel to send the data to the core network.

Figure 3B:
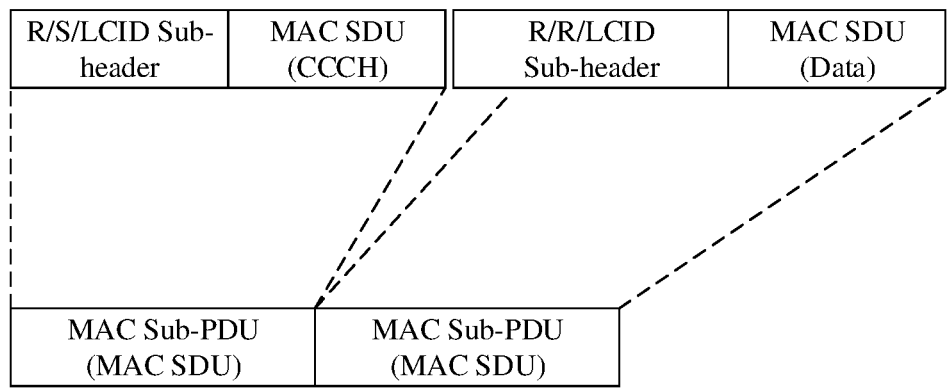

At this time, if the UE does not activate the configuration such as the SRB and the DRB, the configuration such as the SRB and the DRB is activated to obtain the second MAC PDU. In this way, the data is processed according to a normal processing mode, which includes a Packet Data Convergence Protocol (PDCP) layer processing and a Radio Link Control (RLC) layer processing, etc. The second MAC SDU is generated. The second MAC SDU forms the MAC sub-PDU together with the MAC sub-header, and the MAC sub-PDU is put after the MAC sub-PDU carrying the CCCH or DCCH, as illustrated in FIG. 3B. In this way, since the bearer is activated, a LCID of normal data can be used as the LCD. That is, 000001-100000 can be used.

Further, the sub-header of the first MAC SDU includes at least one of LCID information or bearer identification information. The LCID information is configured to indicate a logical channel type of the data, and the bearer identification information is configured to indicate a data bearer corresponding to the data.

Or,

The sub-header of the second MAC SDU includes the LCID information.

The first MAC SDU includes at least one of the LCID information or the bearer identification information. Further, the first MAC SDU at least includes the bearer identification information. The first MAC SDU corresponds to a case that the UE does not activate the configuration such as the SRB and the DRB. Since the data bearer is not activated, the data bearer needs to be indicated in the first MAC SDU. Further, the LCID information included in the sub-header of the first MAC SDU is a logical channel ID dedicated to the IP data.

The second MAC SDU corresponds to a case that the UE activates the bearer, and the second MAC SDU is determined through a preprocessing. When the second MAC PDU is decapsulated, information such as the data bearer of the data may be obtained. The sub-header of the second MAC SDU may only need to include the LCID information, and may not need to include the bearer identification information.

Figure 4:
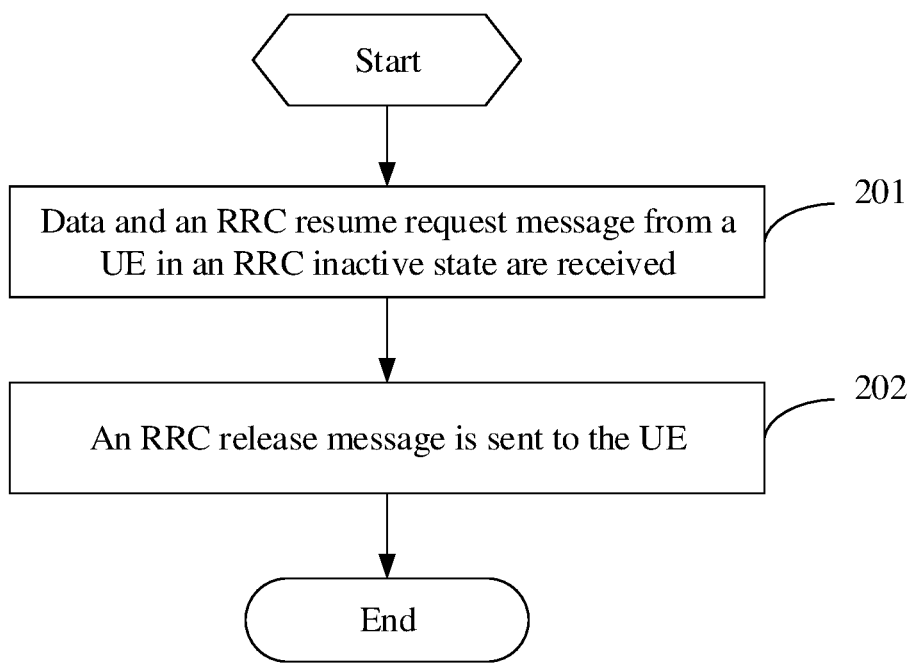
FIG. 4 is a second flowchart of a data transmission method according to an embodiment of the present disclosure.

As illustrated in FIG. 4, embodiments of the present disclosure provide a flowchart of a data transmission method. The data transmission method provided by the embodiments is applied to a first base station or a CU of the first base station or a DU of the first base station. The data transmission method includes the following operations.

At block 201, data and an RRC resume request message from a UE in an RRC inactive state are received.

For a four-step RA procedure, the UE sends a preamble to the first base station or the CU of the first base station or the DU of the first base station at a PRACH occasion. After detecting the preamble, the first base station or the CU of the first base station or the DU of the first base station sends an RA response message to the UE, which is scrambled by using a RA-RNTI corresponding to the PRACH occasion for sending the preamble.

The first base station or the CU of the first base station or the DU of the first base station sends the RA response message to the UE. If the UE determines that the RA response message is sent to the UE itself, for example, RAPIDs are consistent, the UE sends the data and the RRC resume request message to the first base station or the CU of the first base station or the DU of the first base station.

For a two-step RA procedure, the preamble sent by the UE at the PRACH occasion is received, and the data and the RRC resume request message sent by the UE at a PUSCH occasion are received.

At block 202, an RRC release message is sent to the UE.

For the four-step RA procedure, the first base station (the first base station is exemplified below, and the method applied to the first base station may also be applied to the CU of the first base station or the DU of the first base station) may directly send the UE the RRC release message carrying a suspending indication.

For the two-step RA procedure, the first base station may send the RRC release message to the UE through a message B (MSG B). The MSG B may also include the RA response message and the RAPID information.

After the UE receives the RRC release message, an RRC connection is released and the UE enters the RRC inactive state, which may save the power consumption of the UE. The RRC release message may also be configured to indicate a success in solving a UE competition conflict.

Further, after S202, the first base station or the CU of the first base station or the DU of the first base station may send the data to a core network to complete the transmission of the data.

In the embodiment, the first base station or the CU of the first base station or the DU of the first base station receives the data and the RRC resume request message from the UE in the RRC inactive state, and sends the RRC release message to the UE. The timing of the data transmission is advanced so that transmission delay is reduced and process of the UE returning to the RRC inactive state can be accelerated, thereby saving power consumption of the UE.

Further, the RRC resume request message is an RRC resume request message in the four-step RA procedure or an RRC resume request message carried by an MSG A in the two-step RA procedure.

Further, the data is multiplexed or concatenated with the RRC resume request message.

Further, the data is encapsulated to a first MAC PDU or a second MAC PDU. The first MAC PDU includes a first MAC SDU directly generated through the data, and the second MAC PDU includes a second MAC SDU generated through a preprocessing using the data.

The preprocessing includes at least one of a resume processing, an encryption processing or a segmentation processing of a signaling bearer and a data bearer.

Specifically, after the UE receives the RA response message from the first base station or the CU of the first base station or the DU of the first base station, if it is determined that the RA response message is sent to the UE, for example, RAPIDs are consistent, an ID of the UE and UL data are sent on a UL Grant resource. Specifically, the following methods can be adopted.

At this time, if the UE does not activate a configuration such as a SRB and a DRB, the UE directly encapsulates IP data (i.e. the data) as the first MAC SDU into the first MAC PDU.

The UE adds MAC sub-header information (i.e. sub-header) to the data to form an MAC sub-PDU (i.e. sub-PDU), and then put after an MAC sub-PDU containing a CCCH (i.e. the RRC resume request message) or a DCCH. The sub-header of the MAC sub-PDU carrying the CCCH or DCCH contains an indication of whether other MAC PDUs are included. The specific MAC PDU is illustrated in FIG. 3A.

An S domain of a first sub-header indicates whether there are subsequent MAC sub-PDUs, and a sub-header of a second MAC sub-PDU includes two implementation methods.

First implementation method: the sub-header contains a dedicated Logical Channel Identification (LCD) corresponding to the data. The dedicated LCID is used by the base station (which may be understood as the first base station or the CU of the first base station or the DU of the first base station) to identify that the data is IP data. The sub-header also contains DRB ID information corresponding to the data. The DRB ID information is used by the base station to know which bearer of the UE the data corresponds to, so that the base station can accurately place the data in an appropriate User Plane of GPRS Tunneling Protocol (GTP-U) tunnel to send the data to a core network.

Second implementation method: the sub-header contains the DRB ID information corresponding to the data. The base station identifies that the data is IP data according to the DRB ID information and meanwhile know which bearer of the UE the data corresponds to, so that the base station can accurately place the data in the appropriate GTP-U tunnel to send the data to the core network.

At this time, if the UE does not activate the configuration such as the SRB and the DRB, the configuration such as the SRB and the DRB is activated to obtain the second MAC PDU. The data is processed according to a normal processing mode, which includes a Packet Data Convergence Protocol (PDCP) layer processing and a Radio Link Control (RLC) layer processing, etc. The second MAC SDU is generated. The second MAC SDU forms the MAC sub-PDU together with the MAC sub-header, and the MAC sub-PDU is put after the MAC sub-PDU carrying the CCCH or DCCH, as illustrated in FIG. 3B. A LCID of normal data can be used as the LCID. That is, 000001-100000 can be used.

Further, the first MAC SDU includes at least one of LCID information or bearer identification information. The LCID information is configured to indicate a logical channel type of the data, and the bearer identification information is configured to indicate a data bearer corresponding to the data.

Or,

The sub-header of the second MAC SDU includes the LCID information.

The first MAC SDU includes at least one of the LCID information or the bearer identification information. Further, the first MAC SDU at least includes the bearer identification information. The first MAC SDU corresponds to a case that the UE does not activate the configuration such as the SRB and the DRB. Since the data bearer is not activated, the data bearer needs to be indicated in the first MAC SDU. Further, the LCID information included in the sub-header of the first MAC SDU is a logical channel ID dedicated to the IP data.

The second MAC SDU corresponds to a case that the UE activates the bearer, and the second MAC SDU is determined through a preprocessing. When the second MAC PDU is decapsulated, information such as the data bearer of the data may be obtained. The sub-header of the second MAC SDU may include the LCID information, and may not include the bearer identification information.

Further, after the data and the RRC resume request message from the UE in the RRC inactive state are received, the following operation is further included.

Restored data is sent to the core network.

In the embodiment, the data may be sent to the core network via the first base station (corresponding to a case that an anchor base station needs to be switched, i.e., the UE context is relocated), and the data may also be sent to the second base station via the first base station, and then sent to the core network via the second base station (corresponding to a case that the anchor base station does not need to be switched, i.e., the UE context is not relocated), which are respectively described below.

In the case that the anchor base station does not need to be switched, the first base station may send the data and a retrieval UE context request message to the second base station together. If the anchor base station needs to be switched, the first base station may perform the sending processing according to a retrieved UE context.

That is, after the data and the RRC resume request message from the UE in the RRC inactive state are received, the following operations are further included.

The retrieval UE context request message is sent to the second base station.

A retrieval UE context response message from the second base station is received.

The data is sent to the core network.

In the embodiment, after receiving the data and the RRC resume request message from the UE, the first base station obtains Inactive Radio Network Temporary Identifier (I-RNTI) and Message Authentication Code-Integrity (MAC-I) from the RRC resume request message to obtain ID information of the second base station, and sends the UE context request message to the second base station.

If the retrieval UE context reply message is the retrieval UE context failure message, the data is sent to the second base station via the first base station or the CU of the first base station or the DU of the first base station and then sent to the core network via the second base station.

If the retrieval UE context reply message is a retrieval UE context response message, the data is sent to the core network via the first base station or the CU of the first base station or the DU of the first base station.

Specifically, if the retrieval UE context reply message is the retrieval UE context response message, the data is sent to the core network, which is specifically as follows.

According to successfully retrieved UE context, the data is obtained from the first MAC PDU or the second MAC PDU sent by the UE. The first MAC PDU includes the first MAC SDU directly generated through the data. The second MAC PDU includes the second MAC SDU generated through a preprocessing using data.

The data is sent to the core network.

Specifically, if the UE context is successfully retrieved, the DRB ID information and the data are obtained from the first MAC PDU, or the data corresponding to the LCID is obtained by parsing the second MAC PDU, and DRB information and PDU session information are obtained.

After obtaining the data, the first base station sends a path switch request to the core network and receives a path switch request reply from the core network. The first base station sends the data to the core network through an appropriate tunnel.

Further, after the data and the RRC resume request message from the UE in the RRC inactive are received, the following operations are further included.

The retrieval UE context request message is sent to the second base station. The retrieval UE context request message carries at least one of an RRC resume cause indication, a data transmission indication, subsequent data transmission indication information, UE buffer information, the data sent by the UE, LCID information of the data or bearer identification information of the data.

The second base station determines whether to perform UE context relocation based on information in the retrieval UE context request message.

The retrieval UE context failure message sent by the second base station is received.

The RRC resume cause indication includes at least one of an emergency call, a high priority access, a UE termination access, a UE triggered signaling, UE triggered data, a UE triggered voice call or a UE triggered video call.

In an embodiment, the retrieval UE context request message may include the RRC resume cause indication and carry the bearer identification information corresponding to the data. The bearer identification information is configured to be used by the second base station to know the DRB ID corresponding to the data, so that the data can be sent to the core network through an appropriate tunnel.

In another embodiment, the retrieval UE context request message may include at least one of the RRC resume cause indication or the data transmission indication.

After receiving the retrieval UE context failure message, the first base station may send the data to the second base station, and the data is sent to the core network via the second base station. If the first base station sends the data while sending the retrieval UE context request message to the second base station, the first base station does not need to send the data to the second base station again after receiving the retrieval UE context failure message.

Further, the data transmission method may further include the following operations.

Data forwarding information carried by an address indication message or the retrieval UE context failure message from the second base station is received.

The data sent by the UE is forwarded to the second base station.

Specifically, if the data forwarding information is not carried in the retrieval UE context failure message, after the retrieval UE context failure message from the second base station is received, the data forwarding information carried by the address indication message from the second base station is also received. If the data forwarding information is carried in the retrieval UE context failure message, the first base station obtains the data forwarding information through the retrieval UE context failure message.

The data forwarding information may be Transport Network Layer (TNL) information of the second base station, which includes IP information and GTP-U Tunnel Endpoint Identifier (TEID) information, and is used to determine the second base station according to the data forwarding information, and then forward the data to the second base station.

Further, the data sent by the UE is at least one of the IP data, a first MAC PDU data, a first MAC SDU data, a second MAC PDU data, a second MAC SDU data, a restored first RLC SDU and a restored second RLC SDU.

In another embodiment, the retrieval UE context response message may carry at least one of RLC configuration information or transmission layer address information.

Further, the first base station or the CU of the first base station restores the RLC SDU or PDCP PDU and sends resume data to the first base station or the CU of the first base station. The first base station or the CU of the first base station restores the data from the UE, and sends the data to the core network.

Figure 5:
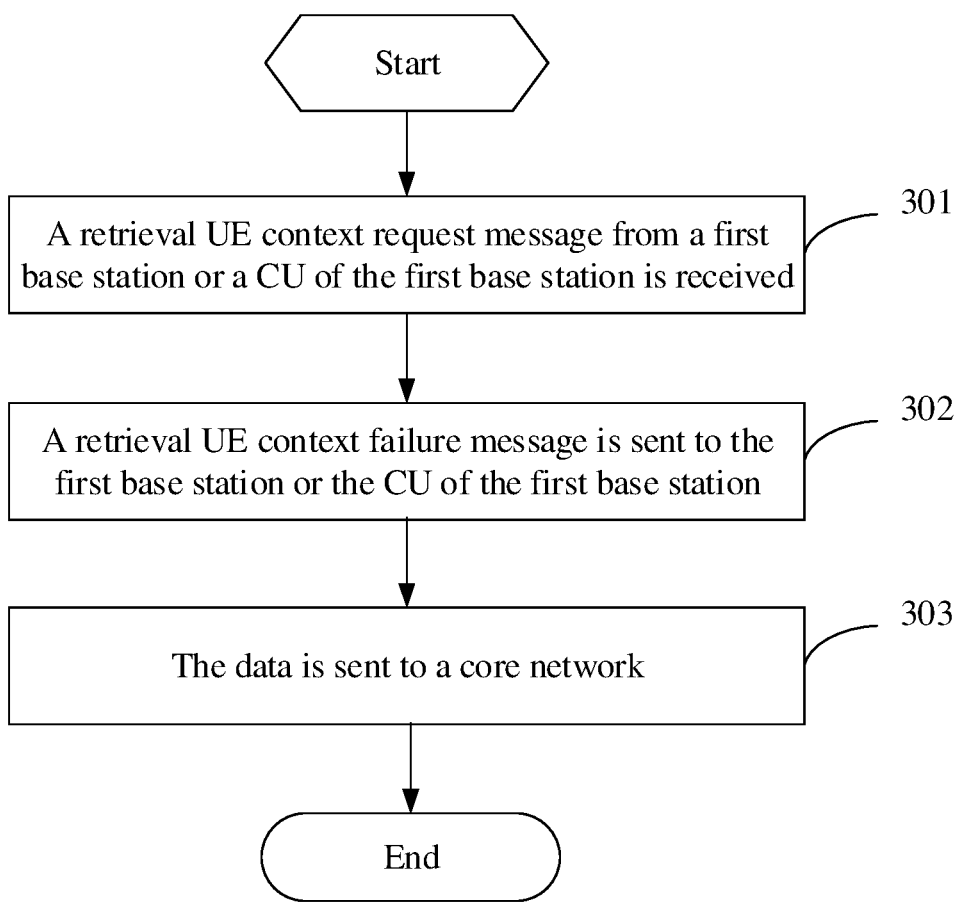
FIG. 5 is a third flowchart of a data transmission method according to an embodiment of the present disclosure.

As illustrated in FIG. 5, embodiments of the present disclosure provide another flowchart of a data transmission method. The data transmission method provided by the embodiments is applied to a second base station. The data transmission method includes the following operations.

At block 301, a retrieval UE context request message from a first base station or a CU of the first base station is received.

At block 302, a retrieval UE context failure message is sent to the first base station or the CU of the first base station.

At block 303, the data is sent to the core network.

The retrieval UE context request message carries at least one of an RRC resume cause indication, a data transmission indication, subsequent data transmission indication information, UE buffer information, the data sent by the UE, LCID information of the data or bearer identification information of the data.

The second base station determines whether to perform UE context transfer based on information in the UE context request message.

In an embodiment, the retrieval UE context request message may include the RRC resume cause indication and carry the bearer identification information corresponding to the data. The bearer identification information is configured to be used by the second base station to know the DRB ID corresponding to the data, so that the data can be sent to the core network through an appropriate tunnel.

In another embodiment, the retrieval UE context request message may include at least one of the RRC resume cause indication or the data transmission indication.

The second base station may be aware of that the RRC resume cause is data transmission, IP data and DRB ID information according to the retrieval UE context request message. Specifically, the IP data and the DRB ID information may be obtained in the following two manners.

First manner: the DRB ID or PDU session ID information is obtained from the retrieval UE context request message, and the IP data is obtained from a data plane between the second base station and the first base station.

Second manner: the DRB or PDU session ID information corresponding to the LCID is obtained by analyzing the MAC PDU sent by the second base station, and the IP data is obtained by analysis.

If the second base station can obtain the data sent by the UE according to the retrieval UE context request message, the data may be sent to the core network. If the second base station does not obtain the data sent by the UE according to the retrieval UE context request message, the data from the first base station or the CU of the first station needs to be received, and the data is sent to the core network.

The retrieval UE context failure message may carry TNL information of the second base station, including IP address information and GTP-U TED information. The TNL information of the second base station may also be informed subsequently by using data forwarding information. The TNL information of the second base station is configured to be used by an access base station to forward the data to the second base station.

In another embodiment, the retrieval UE context failure message may carry at least one of RLC configuration information or transmission layer address information.

Further, the first base station or the CU of the first base station restores RLC SDU or PDCP PDU and sends resume data to the first base station or the CU of the first base station. The first base station or the CU of the first base station restores the data from the UE, and sends the data to the core network.

In another embodiment, the first base station also receives at least one of the RLC configuration information or the transmission layer address information from the second base station after receiving the retrieval UE context response message.

Further, the first base station or the CU of the first base station restores the RLC SDU or PDCP PDU and sends resume data to the first base station or the CU of the first base station. The first base station or the CU of the first base station restores the data from the UE, and sends the data to the core network.

In the embodiment, after the second base station sends the retrieval UE context failure message to the first base station or the CU of the first station, the second base station sends the data to the core network. That is, the data may be sent to the core network in a case that an anchor base station is not switched, thereby improving the transmission efficiency of the data and reducing the transmission delay of the data.

Further, the retrieval UE context failure message carries the data forwarding information. The data transmission method further includes the following operation.

The data sent by the first base station or the CU of the first base station according to the data forwarding information is received.

The data forwarding information may be carried in the retrieval UE context failure message. The data forwarding information may be the TNL information of the second base station, which includes the IP address information and the GTP-U TED information, and is used to determine the second base station according to the data forwarding information. The first base station or the CU of the first base station forwards the data to the second base station according to the data forwarding information.

Further, the data forwarding message may not be carried in the retrieval UE context failure message. The data forwarding message may be carried in an address indication message from the second base station. The second base station sends the address indication message to the first base station or the CU of the first base station. The first base station or the CU of the first base station forwards the data to the second base station according to the data forwarding information.

That is, the data transmission method also includes that the address indication message carrying the data forwarding information is sent to the first base station or the CU of the first base station.

The data sent by the first base station or the CU of the first base station according to the data forwarding information is received.

Figure 6:
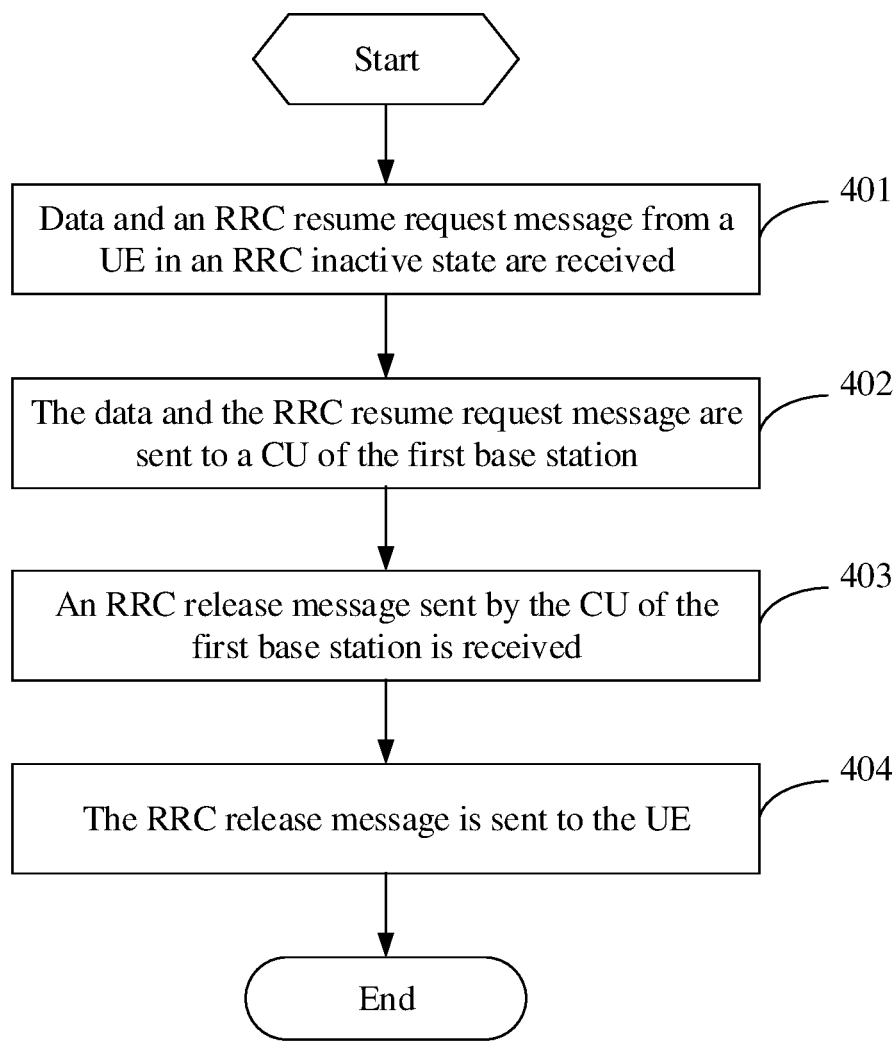
FIG. 6 is a fourth flowchart of a data transmission method according to an embodiment of the present disclosure.

As illustrated in FIG. 6, embodiments of the present disclosure provide yet another flowchart of a data transmission method. The data transmission method provided by the embodiments is applied to a DU of a first base station. The data transmission method includes the following operations.

At block 401, data and an RRC resume request message from a UE in an RRC inactive state are received.

For a four-step RA procedure, a preamble from the UE at a PRACH occasion is received. After the preamble is detected, an RA response message is sent to the UE, which is scrambled by using a RA-RNTI corresponding to the PRACH occasion for sending the preamble.

For a two-step RA procedure, the preamble from the UE at the PRACH occasion is received, and the data and the RRC resume request message from the UE at a PUSCH occasion are received.

At block 402, the data and the RRC resume request message are sent to a CU of the first base station.

At block 403, an RRC release message from the CU of the first base station is received.

For the four-step RA procedure, the CU of the first base station may send the UE the RRC release message carrying a suspending indication.

For the two-step RA procedure, the RRC release message may be carried in a MSG B from the CU of the first base station.

At block 404, the RRC release message is sent to the UE.

The DU of the first base station sends the RRC release message to the UE. After the UE receives the RRC release message, an RRC connection is released and the UE enters the RRC inactive state, which may save the power consumption of the UE. The RRC release message may also be configured to indicate a success in solving a UE competition conflict.

In the embodiment, the DU of the first base station receives the data and the RRC resume request message from the UE in the RRC inactive state, sends the data and the RRC resume request message to the CU of the first base station, receives the RRC release message from the CU of the first base station, and sends the RRC release message to the UE. Timing of the data transmission is advanced so that transmission delay is reduced and process of the UE returning to the RRC inactive state can be accelerated, thereby saving power consumption of the UE.

Further, the RRC resume request message is an RRC resume request message in the four-step random access procedure or an RRC resume request message carried by a MSG A in the two-step RA procedure.

Further, the data is multiplexed or concatenated with the RRC resume request message Further, the data is encapsulated to a first MAC PDU or a second MAC PDU. The first MAC PDU includes a first MAC SDU directly generated through the data, and the second MAC PDU includes a second MAC SDU generated through a preprocessing using the data.

The preprocessing includes at least one of a resume processing, an encryption processing or a segmentation processing of a signaling bearer and a data bearer.

Further, a sub-header of the first MAC SDU includes at least one of LCID information or bearer identification information. The LCID information is configured to indicate a logical channel type of the data, and the bearer identification information is configured to indicate a data bearer corresponding to the data.

Or,

Sub-header of the second MAC SDU includes the LCID information.

Further, the sub-header of the first MAC SDU includes a logical channel identification having LCID information dedicated to IP data.

For detail of the above contents which are the same as those in the embodiments illustrated in FIG. 1, reference can be made to relevant descriptions in the embodiments illustrated in FIG. 1, and would not be repeated here.

Further, the operation of sending the data and the RRC resume request message to the CU of the first base station includes the following operations.

The data is sent to the CU through an initial RRC transfer message or through a user plane interface between the CU and the DU.

Further, the operation that the data is sent to the CU through the user plane interface between the CU and the DU includes the following operations.

A UE context establishment request message carrying transport network layer information from the CU is received.

The data is sent to the CU according to the transport network layer information.

The DU sends the UE context establishment request message to the CU, and the UE context establishment request message carries the transport network layer information, such as network layer address information. The DU sends the data to the CU according to the transport network layer information. Specifically, the DU may send a UE context establishment response message and the data to the CU.

Further, the data transmission method may further include that Buffer Status Report (BSR) information from the UE is received, and the BSR information is sent to the CU of the first base station.

The DU of the first base station receives the BSR information from the UE, and the BSR information is configured to inform the UE of a buffer situation.

The following scenarios are provided below to explain the processes of the data transmission method provided by the disclosure. In FIGS. 7A to 7D, a target base station may be understood as a first base station or a DU of the first base station or a CU of the first base station, an anchor base station may be understood as a second base station, and a core network may be an Access and Mobility Management Function (AMF) network element or a User Plane Function (UPF) network element.

Figure 7A:
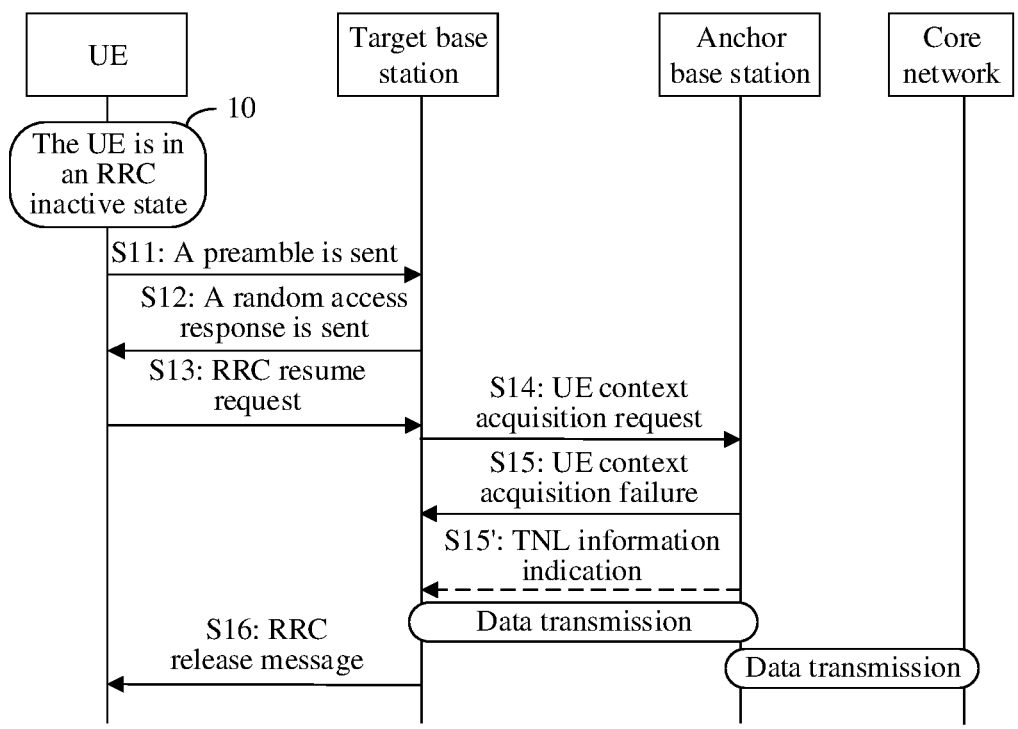
FIGS. 7A to 7E and 7G to 7H are flowcharts of data transmission methods in various scenarios according to embodiments of the present disclosure.

FIG. 7A illustrates a first scenario that data is sent based on a four-step RA, and the anchor base station is not switched.

At S10, a UE is in an RRC inactive state (i.e. RRC inactive state).

At S11, UL small data at the UE needs to be transmitted, and a preamble is sent to a base station at a PRACH occasion.

At S12, the base station detects the preamble, sends an RA response to the UE, which mainly includes information such as TA, UL grant and RAPID, and is scrambled by using a RA-RNTI corresponding to the PRACH occasion for sending the preamble.

At S13, if the UE finds that the RA response is for the UE itself, that is, the RAPIDs are consistent, an ID of the UE and the UL data may be sent on a UL grant resource, which may be accomplished by the following methods.

First method: if the UE does not activate a configuration such as an SRB and a DRB, the UE directly encapsulates IP data as a MAC SDU into the MAC PDU and send out the MAC PDU. The UE adds an MAC sub-header to the data to form an MAC sub-PDU, and then puts same after an MAC sub-PDU containing a CCCH (that is, an RRC resume request message) or a DCCH. A sub-header of the MAC sub-PDU carrying the CCCH or DCCH contains an indication of whether other MAC PDUs are included. The specific MAC PDU is illustrated in FIG. 3A.

An S domain of a first sub-header indicates whether there are subsequent MAC sub-PDUs, and a sub-header of a second MAC sub-PDU includes the following two situations.

First situation: header information (that is, the sub-header) contains a dedicated LCD corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is IP data and meanwhile know which bearer of the UE the data corresponds to, so that the base station can accurately place the data in the appropriate GTP-U tunnel to send to the core network.

Second method: if the UE needs to send the UL data, the configuration such as the SRB and the DRB is first activated. In this way, the data is processed according to a normal processing mode, which includes a PDCP layer processing and a RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. In this way, since the bearer is activated, a LCD of normal data can be used as the LCD. That is, 000001-100000 can be used.

At S14, after receiving the data and a connection resume request message from the UE, an access base station (that is, the target base station) obtains I-RNTI and MAC-I from the connection resume message, obtains ID information of the anchor base station, and sends a UE context acquisition request message (that is, the retrieval UE context request message) to the anchor base station. Contents of the message may have the following situations.

First situation: the RRC resume cause sent by the access base station in the UE context acquisition request message is data transmission. The UE context acquisition request message carries the DRB ID corresponding to the data, which is configured to be used by the anchor base station to obtain the DRB ID corresponding to the data, so that the data can be sent to the core network through an appropriate tunnel.

Second situation: the RRC resume cause sent by the access base station in the UE context acquisition request message is the data transmission, and/or the MAC sub-PDU information is sent to the anchor base station.

At S15, the anchor base station is aware of that a connection resume request reason (that is, the RRC resume cause) is the data transmission, and obtains the IP data and the DRB ID information. The anchor base station sends a UE context acquisition failure message (that is, the retrieval UE context failure message) to the access base station. The message may carry TNL information of the anchor base station, which includes IP address information and GTP-U TED information. TNL indication information may also be sent at S15' to inform the access base station of the TNL information of the anchor base station, so that the access base station can forward the data to the anchor base station.

Specifically, there are two situations for obtaining the IP data and the DRB information.

First situation: DRB ID or PDU session ID information is obtained from the UE context acquisition request message, and the data is obtained from a data plane between the anchor base station and the access base station. The data is sent to the core network.

Second situation: the DRB or PDU session ID information corresponding to the LCD is obtained by analyzing the MAC PDU sent by the access base station, and the data is obtained by analysis. The data is sent to the core network.

At S16, the access base station sends the UE an RRC release message carrying a suspending indication, and the UE enters the inactive state. The RRC release message is also configured to indicate a success in solving a UE competition conflict.

Figure 7B:
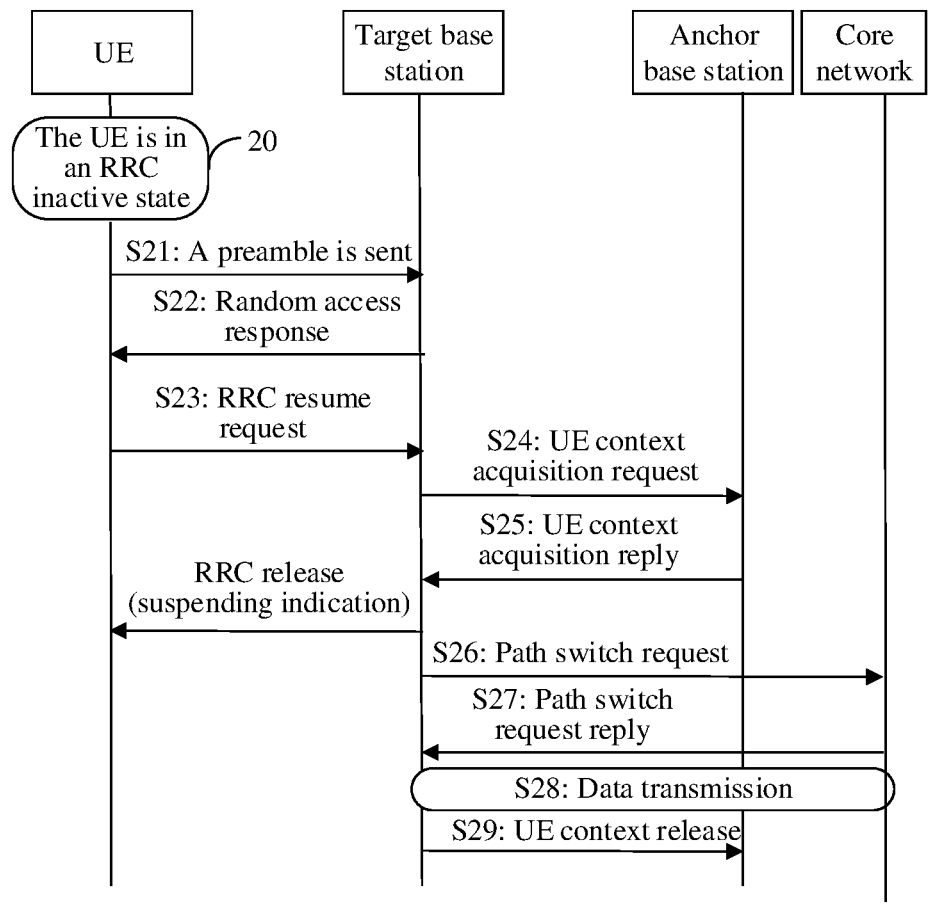

FIG. 7B illustrates a second scenario that the data is sent based on the four-step RA, and the anchor base station is switched.

At S20, the UE is in the RRC inactive state.

At S21, UL small data at the UE needs to be transmitted, and a preamble is sent to the base station at the PRACH occasion.

At S22, the base station detects the preamble, sends an RA response to the UE, which mainly includes information such as TA, UL grant and RAPID, and is scrambled by using the RA-RNTI corresponding to the PRACH occasion for sending the preamble.

At S23, if the UE finds that the RA response is for the UE itself, that is, the RAPIDs are consistent, the ID of the UE and the UL data may be sent on the UL grant resource, which may be accomplished by the following solutions.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains the dedicated LCID corresponding to the data, which is configured to be used by the base station to identify that the data is the IP data. The head information also contains DRB ID information corresponding to the data, which is configured to be used by the base station to know which bearer of the UE the data corresponds to, so that the base station can accurately place the data in the appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCID of normal data can be used as the LCD. That is, 000001-100000 can be used.

At S24, after receiving the data and the connection resume request message from the UE, the access base station obtains the I-RNTI and the MAC-I from the connection resume message, obtains the ID information of the anchor base station, and sends the UE context acquisition request message to the anchor base station.

At S25, the UE context request reply message from the anchor base station is received. If the UE context is successfully retrieved, the DRB ID information and the data are obtained from the MAC sub-PDU. Alternatively, the data is obtained by analyzing the MAC PDU, and DRB information and PDU session information are obtained.

At S26, the access base station sends a path switch request to the core network.

At S27, a path switch request reply from the core network is received.

At S28, the access base station sends the data to the core network through an appropriate tunnel.

At S29, the access base station sends a UE context release message to the anchor base station.

Figure 7C:
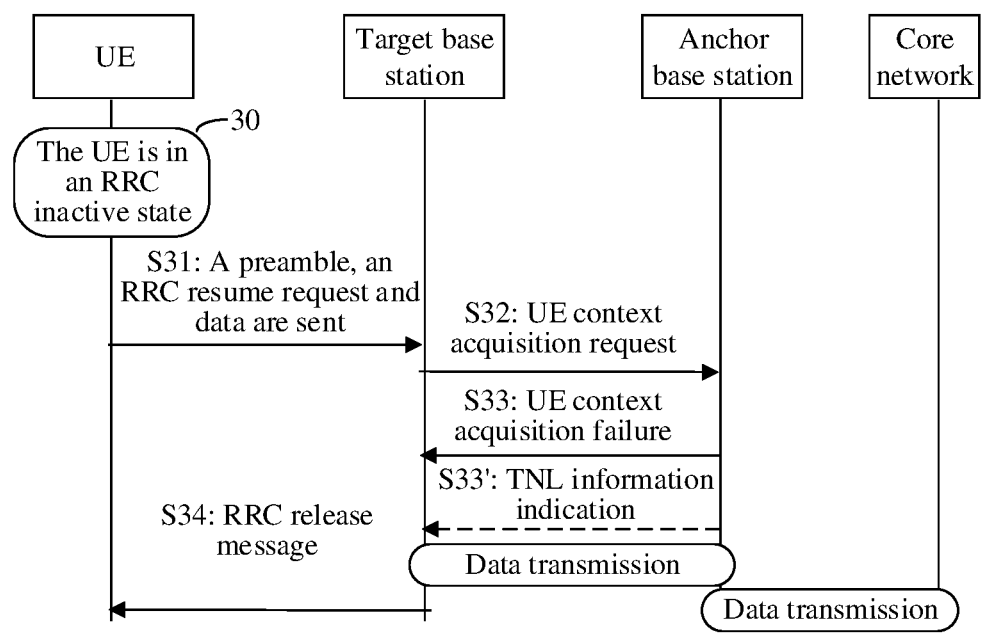

FIG. 7C illustrates a third scenario that the data is sent based on a two-step RA, and the anchor base station is not switched.

At S30, the UE is in the RRC inactive state.

At S31, UL small data at the UE needs to be transmitted, and a preamble is sent to the base station at the PRACH occasion. The RRC resume request and the data are sent at the PUSCH occasion. There are multiple specific solutions as follows.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCD corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCD of normal data can be used as the LCD. That is, 000001-100000 can be used.

At S32, the access base station detects the preamble and successfully demodulates the MAC PDU information carried by the PUSCH.

After receiving the data and the connection resume request message (that is, the RRC resume request message) from the UE, the access base station obtains I-RNTI and MAC-I from the connection resume message, obtains the ID information of the anchor base station, and sends the UE context acquisition request message to the anchor base station. Contents of the message may have the following situations.

First situation: the RRC resume cause sent by the access base station in the UE context acquisition request message is data transmission. The UE context acquisition request message carries the DRB ID corresponding to the data, which is configured to be used by the anchor base station to obtain the DRB ID corresponding to the data, so that the data can be sent to the core network through an appropriate tunnel.

Second situation: the RRC resume cause sent by the access base station in the UE context acquisition request message is the data transmission, and/or the MAC sub-PDU information is sent to the anchor base station.

At S33, the anchor base station is aware of that a connection resume request reason is the data transmission, and obtains the IP data and the DRB ID information. The anchor base station sends a UE context acquisition failure message to the access base station. The message may carry TNL information of the anchor base station, which includes IP address information and GTP-U TEID information. TNL indication information may also be sent at S15' to inform the access base station of the TNL information of the anchor base station, so that the access base station can forward the data to the anchor base station.

Specifically, the IP data and the DRB information can be obtained by the following operations. DRB ID or PDU session ID information is obtained from the UE context acquisition request message, and the data is obtained from a data plane between the anchor base station and the access base station. The data is sent to the core network. Alternatively, DRB or PDU session ID information corresponding to the LCID is obtained by analyzing the MAC PDU sent by the access base station, and the data is obtained by analysis. The data is sent to the core network.

At S34, the access base station sends an MSG B message to the UE, which may include a successful RA response message, the RRC release information, and the RAPID information, etc.

Further, if the UE receives the successful RA response message and the UE ID and the RAPID correspond to the same of the UE itself, it is considered that the data is successfully sent. Otherwise the RA is tried continuously.

Figure 7D:
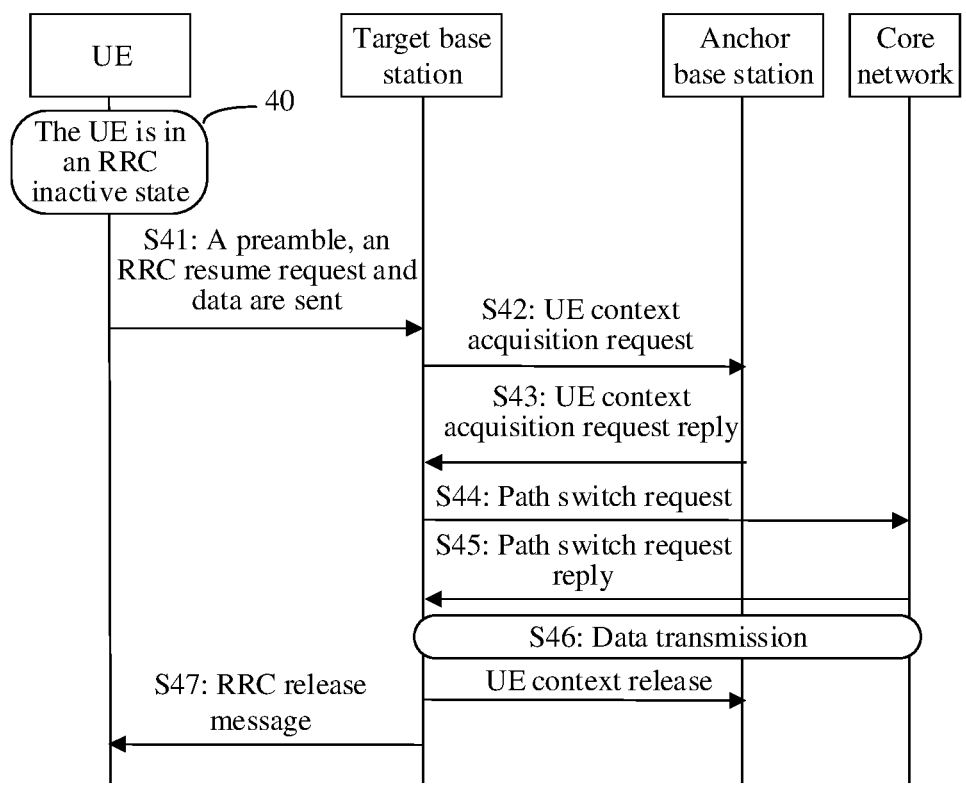

FIG. 7D illustrates a fourth scenario that the data is sent based on the two-step RA, and the anchor base station is switched.

At S40, the UE is in the RRC inactive state.

At S41, UL small data at the UE needs to be transmitted, and a preamble is sent to the base station at the PRACH occasion. The RRC resume request and the data are sent at the PUSCH occasion. There are multiple specific solutions as follows.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCID corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCID of normal data can be used as the LCD. That is, 000001-100000 can be used.

At S42, after receiving the data and the connection resume request message from the UE, the access base station obtains the I-RNTI and the MAC-I from the connection resume message, obtains the ID information of the anchor base station, and sends the UE context acquisition request message to the anchor base station.

At S43, the UE context request reply message from the anchor base station is received. If the UE context is successfully retrieved, the DRB ID information and the data are obtained from the MAC sub-PDU. Alternatively, the data is obtained by analyzing the MAC PDU, and DRB information and PDU session information are obtained.

At S44, the access base station sends a path switch request to the core network.

At S45, a path switch request reply from the core network is received.

At S46, the access base station sends the data to the core network through an appropriate tunnel.

At S47, the access base station sends an MSG B to the UE, which may include successful RA response information, the RRC release information, the RAPID information, etc.

Further, if the UE receives the successful RA response message and the UE ID and the RAPID correspond to the same of the UE itself, it is considered that the data is successfully sent. Otherwise the RA is tried continuously.

Figure 7E:
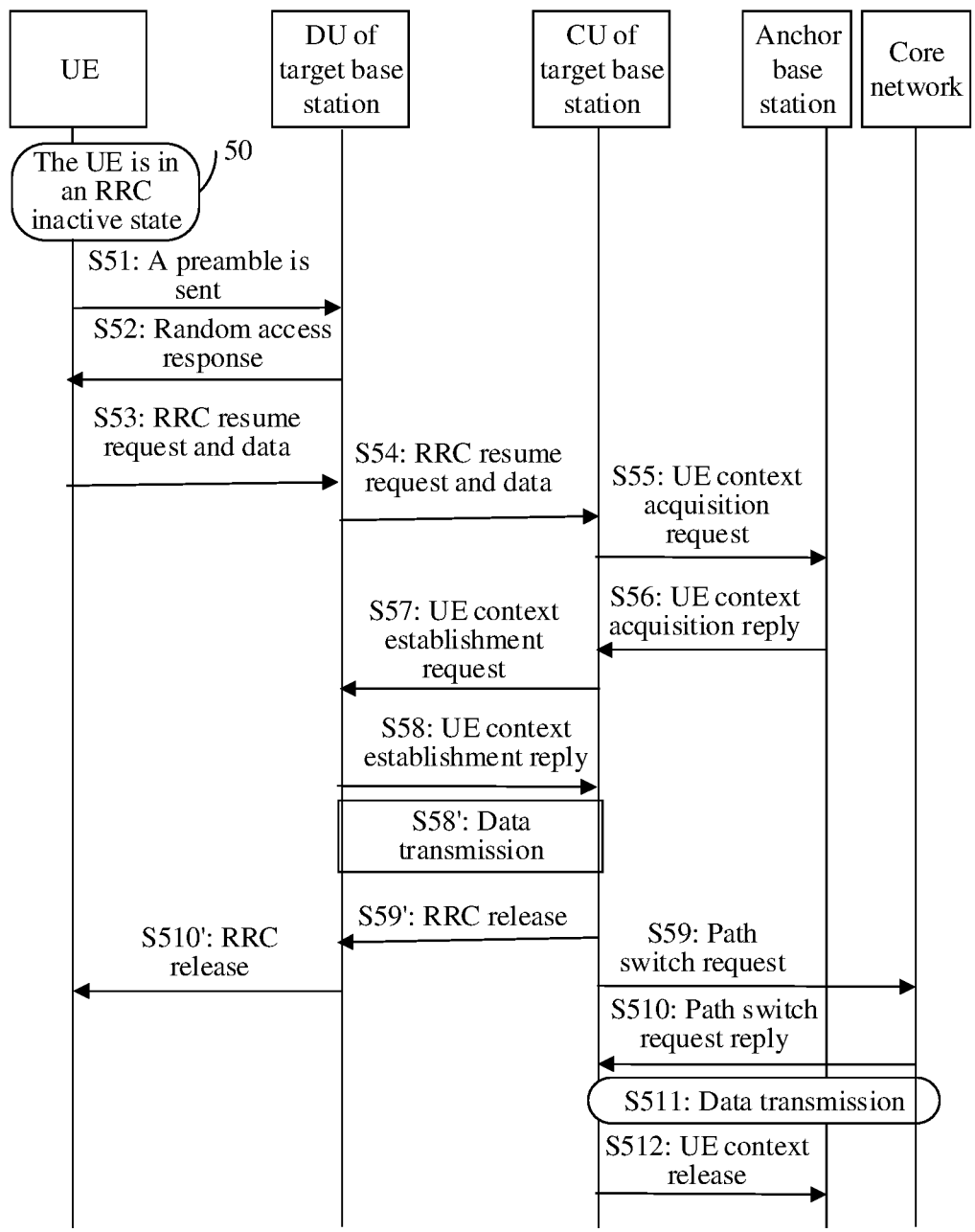

As the first base station may be classified as the CU of the first base station and the DU of the first base station. There is information interaction between the CU and the DU. FIG. 7E illustrates operations that the data is sent based on the four-step RA, and the anchor base station is not switched, which is also applicable to the scenarios that the anchor base station is switched in the four-step RA, that the anchor base station is switched in the two-step RA, and that the anchor base station is not switched in the two-step RA.

FIG. 7E illustrates a scenario that a CU-DU architecture sends the data based on the four-step RA, and the anchor base station is switched.

At S50, the UE is in the RRC inactive state.

At S51, UL small data at the UE needs to be transmitted, and a preamble is sent to the UD at the PRACH occasion.

At S52, the DU detects the preamble, sends an RA response to the UE, which mainly includes information such as TA, UL grant and RAPID, and is scrambled by using the RA-RNTI corresponding to the PRACH occasion for sending the preamble.

At S53, if the UE finds that the RA response is for the UE itself, that is, the RAPIDs are consistent, the ID of the UE and the UL data may be sent on the UL grant resource, which may be accomplished by the following solutions.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCD corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCD of normal data can be used as the LCD. That is, 000001-100000 can be used.

At S54, after receiving the data and the connection resume request message from the UE, the DU of the access base station sends the connection resume request message to the CU. Optionally, the data is sent to the CU. The CU obtains I-RNTI and MAC-I from the connection resume message, and obtains the ID information of the anchor base station.

At S55, the CU sends the UE context acquisition request message to the anchor base station.

At S56, the CU receives the UE context request reply message from the anchor base station. If the UE context is successfully retrieved, the DRB ID information and the data are obtained from the MAC sub-PDU. Alternatively, the data is obtained by analyzing the MAC PDU, and DRB information and PDU session information are obtained.

At S57, the CU of the access base station sends the DU the UE context establishment request that carries transport network layer address information.

At S58, the DU sends the UE context establishment reply message to the CU.

At S58', optionally, the DU sends the data to the CU according to the transport network layer address information.

At S59, the CU sends a path switch request to the core network.

At S59', the CU sends the RRC release message to the DU.

At S510', the DU sends the RRC release message to the UE.

At S510, the path switch request reply from the core network is received.

At S511, the CU sends the data to the core network through an appropriate tunnel.

At S512, the CU sends a UE context release message to the anchor base station.

The following describes a scenario that the CU-DU architecture sends the data based on the four-step RA, and the anchor base station is not switched.

The UE is in the RRC inactive state.

UL small data at the UE needs to be transmitted, and a preamble is sent to the UD at the PRACH occasion.

The DU detects the preamble, sends an RA response to the UE, which mainly includes information such as TA, UL grant and RAPID, and is scrambled by using the RA-RNTI corresponding to the PRACH occasion for sending the preamble.

If the UE finds that the RA response is for the UE itself, that is, the RAPIDs are consistent, the ID of the UE and the UL data may be sent on the UL grant resource, which may be accomplished by the following solutions.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCD corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. In this case, a LCID of normal data can be used as the LCD. That is, 000001-100000 can be used.

After receiving the data and the connection resume request message from the UE, the DU of the access base station sends the connection resume request message to the CU. Optionally, the data is sent to the CU. The CU obtains I-RNTI and MAC-I from the connection resume message, and obtains the ID information of the anchor base station.

The CU sends the UE context acquisition request message to the anchor base station.

The CU receives the UE context request reply message from the anchor base station. The context request reply message is the UE context acquisition failure message. The message may carry the TNL information of the anchor base station, which may include IP address information and GTP-U TEID information. The TNL indication information may also be sent in subsequent operations to inform the access base station of the TNL information of the anchor base station, so that the access base station may forward the data to the anchor base station.

The CU sends the DU the UE context establishment request that carries the transport network layer address information.

The DU sends the UE context establishment reply message to the CU.

Optionally, the DU sends the data to the CU according to the transport network layer address information.

The CU sends the RRC release message to the DU.

The DU sends the RRC release message to the UE.

The CU sends the data to the anchor base station.

The anchor base station sends the data to the core network.

The CU sends the UE context release message to the anchor base station.

Figure 7G:
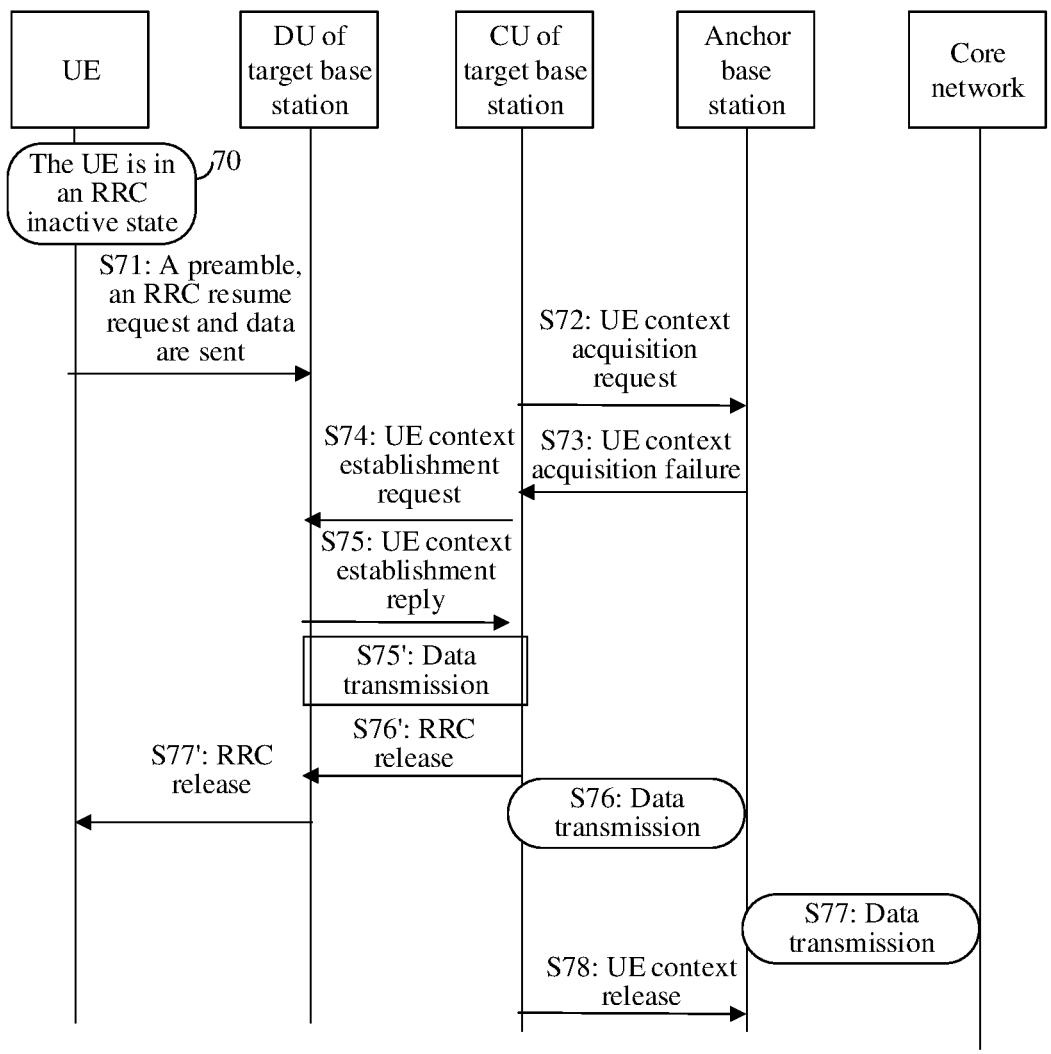

FIG. 7G illustrates a scenario that the CU-DU architecture sends the data based on the two-step RA, and the anchor base station is not switched.

At S70, the UE is in the RRC inactive state.

At S71, UL small data at the UE needs to be transmitted, and a preamble is sent to the base station at the PRACH occasion. The RRC resume request and the data are sent at the PUSCH occasion. There are multiple specific solutions as follows.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCID corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The UL data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCID of normal data can be used as the LCD. That is, 000001-100000 can be used.

At S72, after receiving the data and the connection resume request message from the UE, the DU sends the connection resume request message to the CU. Optionally, the data is sent to the CU. The CU obtains I-RNTI and MAC-I from the connection resume message, and obtains the ID information of the anchor base station.

At S73, the CU receives the UE context request reply message from the anchor base station, and the UE context request reply message is the UE context acquisition failure message. If the UE context is successfully retrieved, the DRB ID information and the data are obtained from the MAC sub-PDU. Alternatively, the data is obtained by analyzing the MAC PDU, and DRB information and PDU session information are obtained.

At S74, the CU sends the DU the UE context establishment request that carries the transport network layer address information.

At S75, the DU sends the UE context establishment reply message to the CU.

At S75', optionally, the DU sends the data to the CU according to the transport network layer address information.

At S76', the CU sends the RRC release message to the DU.

At S77', the DU sends the RRC release message to the UE.

At S76, the CU sends the data to the anchor base station.

At S77, the anchor base station sends the data to the core network.

At S78, the CU sends the UE context release message to the anchor base station.

Figure 7H:
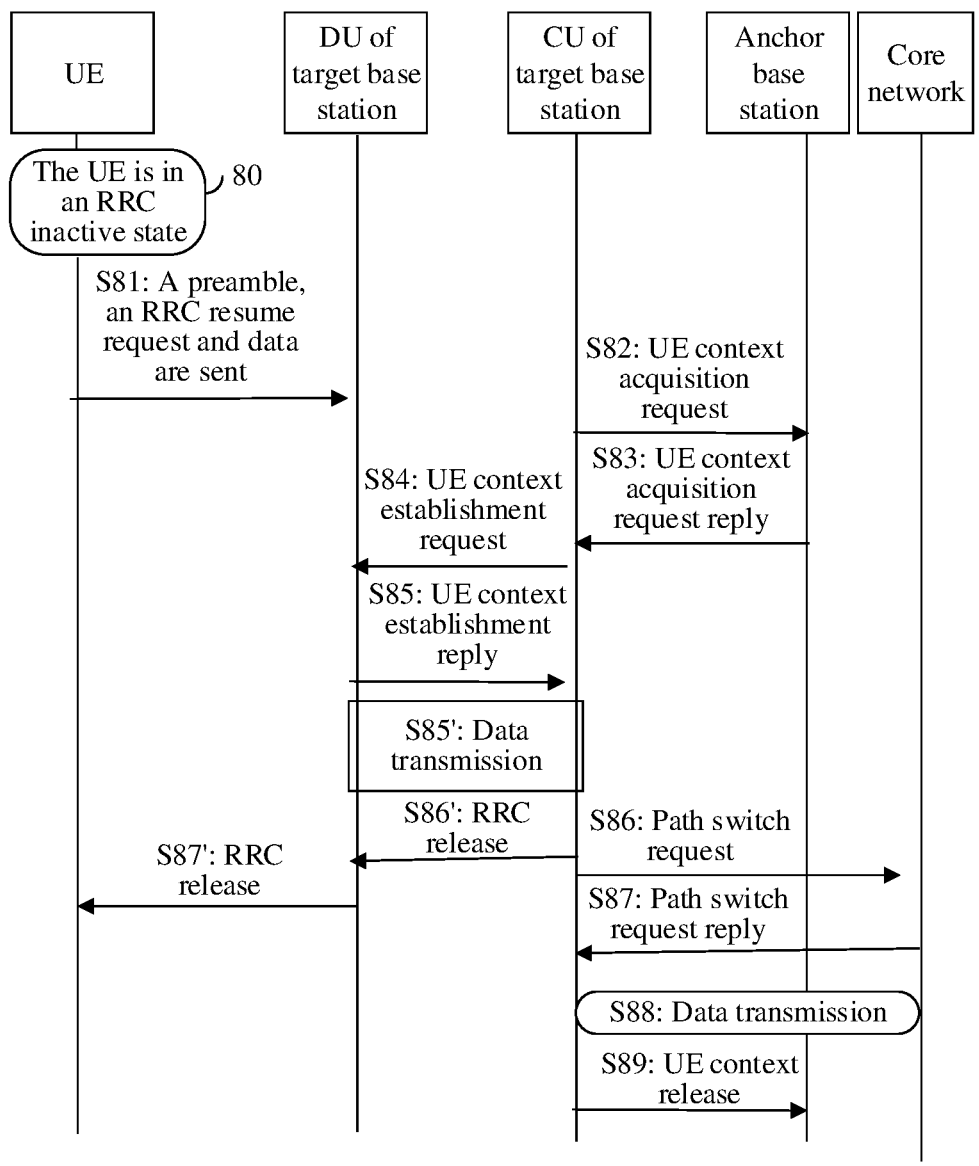

FIG. 7H illustrates a scenario that the CU-DU architecture sends the data based on the two-step RA, and the anchor base station is switched.

At S80, the UE is in the RRC_inactive state.

At S81, UL small data at the UE needs to be transmitted, and a preamble is sent to the base station at the PRACH occasion. The RRC resume request and the data are sent at the PUSCH occasion. There are multiple specific solutions as follows.

First solution: if the UE does not activate the configuration such as the SRB and the DRB, the UE directly encapsulates the IP data as the MAC SDU into the MAC PDU and send out the MAC PDU. The UE adds the MAC sub-header to the data to form the MAC sub-PDU, and then puts same after the MAC sub-PDU containing the CCCH (that is, the RRC resume request message) or the DCCH. The sub-header of the MAC sub-PDU carrying the CCCH or DCCH contains the indication of whether other MAC PDUs are included. The specific MAC PDU is illustrated in FIG. 3A.

The S domain of the first sub-header indicates whether there are subsequent MAC sub-PDUs, and the sub-header of the second MAC sub-PDU includes the following two situations.

First situation: header information (that is, the sub-header) contains a dedicated LCID corresponding to the data, which is configured to be used by the base station to identify that the data is IP data. The head information also contains DRB ID information corresponding to the data, which is configured to be used by the base station to know which bearer of the UE the data corresponds to, so that the base station can accurately place the data in an appropriate GTP-U tunnel to send to the core network.

Second situation: the header information contains the DRB ID information corresponding to the data. The base station identifies that the data is the IP data and meanwhile know which bearer of the UE the data corresponds to, so that the base station can accurately place the data in the appropriate GTP-U tunnel to send to the core network.

Second solution: if the UE needs to send the UL data, the configuration such as the SRB and the DRB is first activated. The data is processed according to the normal processing mode, which includes the PDCP layer processing and the RLC layer processing, etc. The MAC SDU is generated. The SDU forms the MAC sub-PDU together with the MAC sub-header, and the MAC sub-header is put after the MAC sub-PDU carrying the CCCH or DCCH, as illustrated in FIG. 3B. The LCID of normal data can be used as the LCD. That is, 000001-100000 can be used.

At S82, after receiving the data and the connection resume request message from the UE, the DU sends the connection resume request message to the CU. Optionally, the data is sent to the CU. The CU obtains I-RNTI and MAC-I from the connection resume message, and obtains the ID information of the anchor base station.

At S83, the CU receives the UE context request reply message from the anchor base station.

At S84, the CU sends the DU the UE context establishment request that carries the transport network layer address information.

At S85, the DU sends the UE context establishment reply message to the CU.

At S85', optionally, the DU sends the data to the CU according to the transport network layer address information.

At S86, the CU sends a path switch request to the core network.

At S86', the CU sends the RRC release message to the DU.

At S87, a path switch request reply from the core network is received.

At S88, the CU sends the data to the core network through an appropriate tunnel.

At S89, the CU sends the UE context release message to the anchor base station.

In the above embodiments, the target base station receives the data sent by the UE in a RA procedure, and the data is sent to the core network when the anchor base station is switched or not switched. When the anchor base station is not switched, the target base station and the anchor base station exchange information such as the data, the DRB ID and the TNL information of the anchor base station, and the target base station sends the data to the anchor base station. The data is sent to the core network via the anchor base station. When the anchor base station is switched, the target base station acquires the UE context, retrieves the UE context to obtain the data, and sends the data to the core network after path switch.

The above embodiments use the two-step RA procedure or the four-step RA procedure to send a small data. The data may be sent in a scenario where the RRC connection is not resumed and the anchor base station may be switched or may not be switched, so as to solve the shortcomings of large data transmission delay and low efficiency caused by the fact that the RRC connection needs to be first resumed for small and medium data transmission, and that the anchor base station needs to be switched in the related art.

Figure 8:
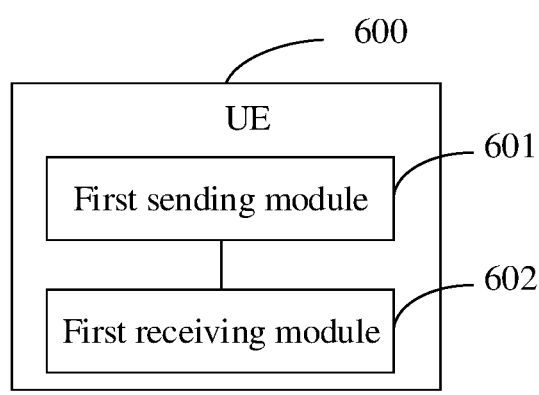
FIG. 8 and FIG. 9 are structural diagram of UEs according to embodiments of the present disclosure.

As illustrated in FIG. 8, FIG. 8 is a structural diagram of a UE according to an embodiment of the present disclosure. As illustrated in FIG. 8, a UE 600 is in an RRC inactive state. The UE 600 includes a first sending module 601 and a first receiving module 602.

The first sending module 601 is configured to send data and an RRC resume request message to a first base station or a CU of the first base station or a DU of the first base station.

The first receiving module 602 is configured to receive an RRC release message from the first base station or the CU of the first base station or the DU of the first base station.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, an encapsulation template is further included, which is configured to encapsulate the data directly as a first MAC SDU to a first MAC PDU.

Or,

The encapsulation template is configured to encapsulate a second MAC SDU to a second MAC PDU. The second MAC SUD is generated through a preprocessing using the data.

Further, the preprocessing includes at least one of a resume processing, an encryption processing or a segmentation processing of a signaling bearer and a data bearer.

Further, a sub-header of the first MAC SDU includes at least one of LCID information or bearer identification information. The LCID information is configured to indicate a logical channel type of the data, and the bearer identification information is configured to indicate a data bearer corresponding to the data.

Or,

A sub-header of the second MAC SDU includes the LCID information.

Further, the sub-header of the first MAC SDU includes a logical channel identification having LCID information dedicated to IP data.

The UE 600 may implement the processes implemented by the UE in the method embodiment illustrated in FIG. 1 and can achieve the same technical effect, which would not be described here to avoid repetition.

Figure 9:
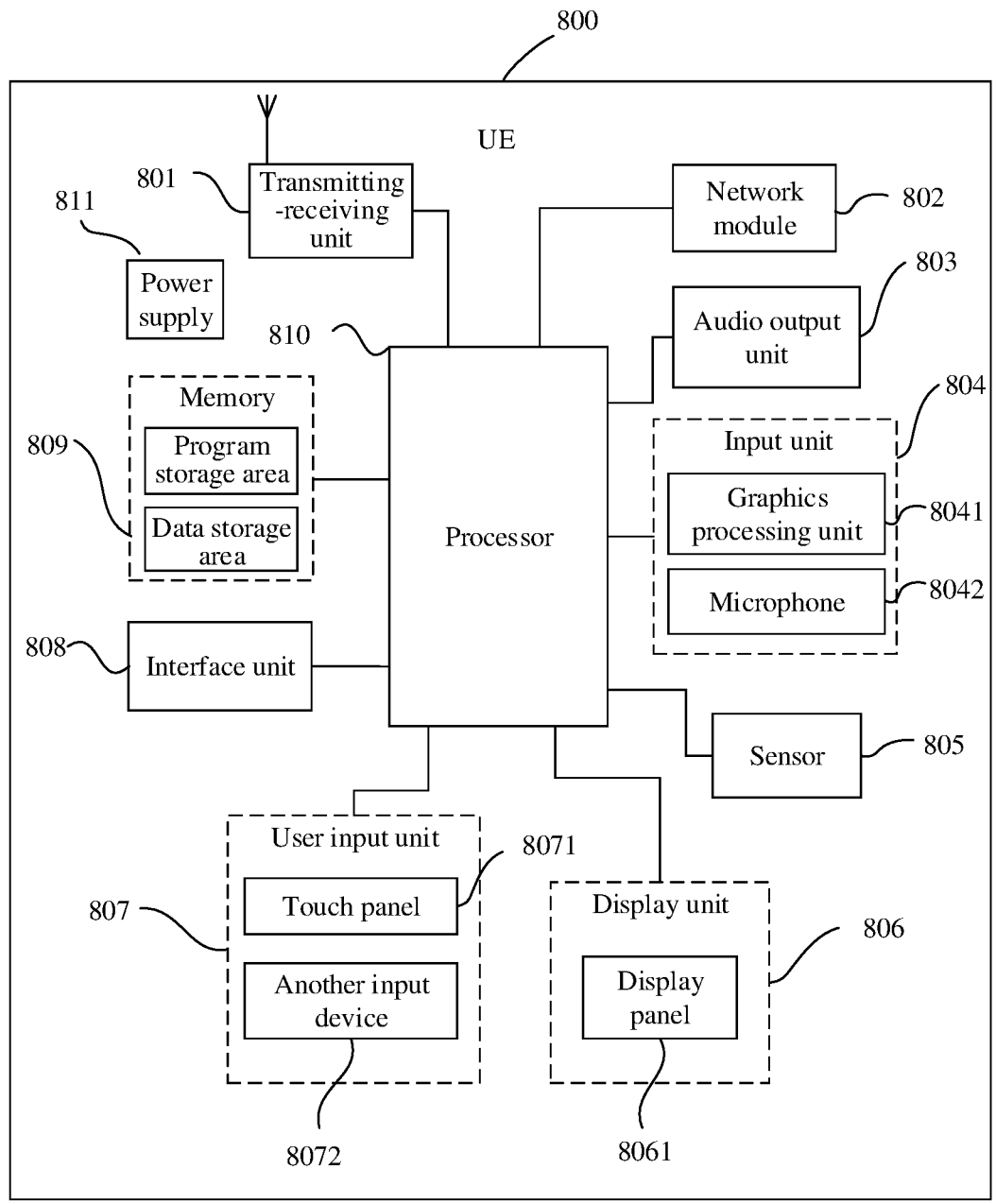

FIG. 9 is a structural diagram of a UE that implements the embodiments of the present disclosure. The UE 800 includes, but is not limited to, a transmitting-receiving unit (that is, a transceiver) 801, a network module 802, an audio output unit 803, an input unit 804, a sensor 805, a display unit 806, a user input unit 807, an interface unit 808, a memory 809, a processor 810, a power supply 811, etc. A person skilled in the art may understand that the UE structure illustrated in FIG. 9 does not constitute a restriction on the UE. The UE may include parts more or fewer than those illustrated in the figure, or combine some parts, or have different part arrangements. In the embodiments of the present disclosure, the UE may include, but is not limited to, a mobile phone, a tablet computer, a notebook computer, a palmtop computer, a vehicle-mounted UE, a wearable device, a pedometer, etc.

In an embodiment of the present disclosure, the transmitting-receiving unit 801 is configured to send data and an RRC resume request message to a first base station or a CU of the first base station or a DU of the first base station, and receive an RRC release message from the first base station or the CU of the first base station or the DU of the first base station.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, the processor 810 is configured to encapsulate the data directly as a first MAC SDU to a first MAC PDU.

Or,

The processor 810 is configured to encapsulate a second MAC SDU to a second MAC PDU. The second MAC SDU is generated through a preprocessing using the data.

Further, the preprocessing includes at least one of a resume processing, an encryption processing or a segmentation processing of a signaling bearer and a data bearer.

Further, a sub-header of the first MAC SDU includes at least one of LCID information or bearer identification information. The LCID information is configured to indicate a logical channel type of the data, and the bearer identification information is configured to indicate a data bearer corresponding to the data.

Or,

A sub-header of the second MAC SDU includes the LCID information.

Further, the LCID information in the sub-header of the first MAC SDU is a logical channel identification dedicated to an Internet Protocol (IP) data.

The UE 800 can implement the processes implemented by the UE in the method embodiment illustrated in FIG. 1 and can achieve the same technical effect, which would not be described here to avoid repetition.

It is to be understood that in the embodiments of the present disclosure, the transmitting-receiving unit 801 may be configured to receive and send a signal in the process of transmitting and receiving information or calling, specifically, to receive downlink data from the base station and then send same to the processor 810 for processing, and moreover send the UL data to the base station. Generally, the transmitting-receiving unit 801 includes, but is not limited to, an antenna, at least one amplifier, a transceiver, a coupler, a low noise amplifier, a duplexer, etc. In addition, the transmitting-receiving unit 801 may also communicate with the network and other devices through a wireless communication system.

The UE provides a user with wireless broadband Internet access through the network module 802, such as helping the user to send and receive e-mails, browse web pages and access streaming media.

The audio output unit 803 may convert audio data received by the transmitting-receiving unit 801 or the network module 802 or stored in the memory 809 into an audio signal and output the audio signal as sound. Furthermore, the audio output unit 803 may also provide audio output (for example, call signal receiving sound, message receiving sound, etc.) related to a specific function executed by the UE 800. The audio output unit 803 includes a speaker, a buzzer, a receiver, etc.

The input unit 804 is configured to receive an audio signal or a video signal. The input unit 804 may include a Graphics Processing Unit (GPU) 8041 and a microphone 8042. The GPU 8041 processes image data of a still picture or video obtained by an image capturing apparatus (such as a camera) in a video capturing mode or an image capturing mode. The processed image frame may be displayed on the display unit 806. The image frame processed by the GPU 8041 can be stored in the memory 809 (or other storage media) or sent via the transmitting-receiving unit 801 or the network module 802. The microphone 8042 may receive sound and can process such sound into the audio data. The processed audio data may be converted into a format output which may be sent to a mobile communication base station via the transmitting-receiving unit 801 in the case of a telephone call mode.

The UE 800 also includes at least one sensor 805, such as a light sensor, a motion sensor and other sensors. Specifically, the light sensor includes an ambient light sensor and a proximity sensor. Herein, the ambient light sensor may adjust the brightness of a display panel 8061 according to the brightness of the ambient light, and the proximity sensor may turn off the display panel 8061 and/or backlight when the UE 800 moves to the ear. As one kind of motion sensor, an accelerometer sensor may detect the acceleration in all directions (generally three axes), may detect the magnitude and direction of gravity when at rest, and may be configured to identify a UE posture (such as screen switching, a related game, and magnetometer posture calibration), a vibration identification related function (such as the pedometer and tapping), etc. The sensor 805 may also include a fingerprint sensor, a pressure sensor, an iris sensor, a molecular sensor, a gyroscope, a barometer, a hygrometer, a thermometer, an infrared sensor, etc., which will not be described here.

The display unit 806 is configured to display information input by the user or provided to the user. The display unit 806 may include the display panel 8061, and the display panel 8061 may be configured in the form of a Liquid Crystal Display (LCD), an Organic Light-Emitting Diode (OLED), etc.

The user input unit 807 may be configured to receive input digital or character information and generate key signal input related to user settings and function control of the UE. Specifically, the user input unit 807 includes a touch panel 8071 and another input device 8072. The touch panel 8071, also called a touch screen, may collect a touch operation (such as the user operation on the touch panel 8071 or near the touch panel 8071 by using any suitable object or accessory such as a finger and a stylus) on or near the touch panel 8071. The touch panel 8071 may include two parts, that is, a touch detection apparatus and a touch controller. The touch detection apparatus detects a touch orientation of the user, detects the signal brought by the touch operation, and transmits the signal to the touch controller. The touch controller receives touch information from the touch detection apparatus, converts the touch information into contact coordinates, sends the contact coordinates to the processor 810, and receives and executes a command sent by the processor 810. In addition, the touch panel 8071 may be implemented in various types such as resistive, capacitive, infrared and surface acoustic wave. In addition to the touch panel 8071, the user input unit 807 may also include another input device 8072. Specifically, the another input device 8072 may include, but is not limited to, a physical keyboard, a function key (such as a volume control key and a switch key), a trackball, a mouse, and a joystick, which would not be described here.

Further, the touch panel 8071 may cover the display panel 8061. When the touch panel 8071 detects the touch operation on or near the touch panel, the touch operation is transmitted to the processor 810 to determine the type of a touch event, and then the processor 810 provides a corresponding visual output on the display panel 8061 according to the type of the touch event. Although in FIG. 8, the touch panel 8071 and the display panel 8061 are two independent components to implement the input and output functions of the UE. However, in some embodiments, the touch panel 8071 and the display panel 8061 may be integrated to implement the input and output functions of the UE, which is not specifically limited here.

The interface unit 808 is an interface for an external apparatus to connect with the UE 800. For example, the external apparatus may include a wired or wireless headset port, an external power supply (or battery charger) port, a wired or wireless data port, a memory card port, a port for connecting an apparatus equipped with an identification module, an audio Input/Output (I/O) port, a video I/O port, an earphone port, etc. The interface unit 808 may be configured to receive an input (for example, data information, power, etc.) from the external apparatus and transmit the received input to one or more elements within the UE 800 or may be configured to transmit data between the UE 800 and the external apparatus.

The memory 809 may be configured to store the computer program and various data. The memory 809 may mainly include a program storage area and a data storage area. The program storage area may store an operating system, an application program (such as a sound playing function and an image playing function) required by at least one function, etc. The data storage area may store data (such as the audio data and a phone book) created according to the use of the mobile phone. In addition, the memory 809 may include a high-speed RA memory and may further include a non-volatile memory, such as at least one magnetic storage device, a flash memory, or another non-volatile solid-state memory device.

The processor 810 is a control center of the UE, connects all parts of the UE with various interfaces and lines, and executes various functions of the UE and processes data by running or executing a software program and/or module stored in the memory 809 and calling the data stored in the memory 809, so as to monitor the UE overall. The processor 810 may include one or more processing units. Optionally, the processor 810 may integrate an application processor and a modem processor. The application processor mainly processes the operating system, the user plane interface, the application program, etc. The modem processor mainly processes a wireless communication. It is to be understood that the above modem processor may not be integrated into the processor 810.

The UE 800 may further include the power supply 811 (such as a battery) for supplying power to various components. Optionally, the power supply 811 may be logically connected to the processor 810 through a power management system, so as to implement functions of charging management, discharging management, and power consumption management through the power management system.

In addition, the UE 800 includes some unillustrated functional modules, which will not be described here.

Optionally, embodiments of the present disclosure further provides a UE, which includes the processor 810, the memory 809 and a computer program stored on the memory 809 and being executable on the processor 810. The computer program, when executed by the processor 810, implements the processes of the data transmission method embodiment illustrated in FIG. 1 and can achieve the same technical effect, which would not be described here to avoid repetition.

Figure 10:
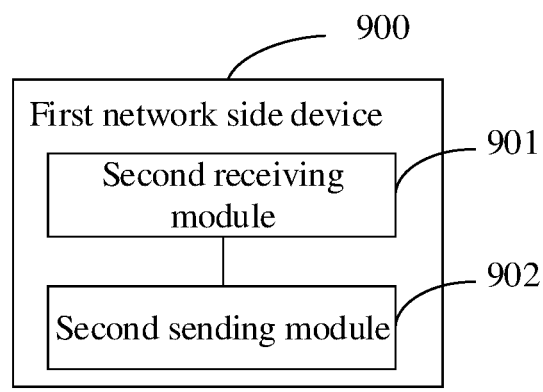
FIGS. 10 to 13 are structural diagram of network side devices according to embodiments of the present disclosure.

Referring to FIG. 10, FIG. 10 is a structural diagram of a network side device according to an embodiment of the present disclosure. As illustrated in FIG. 10, a first network side device 900 is a first base station or a CU of the first base station or a DU of the first base station. The first network side device 900 includes a second receiving module 901 and a second sending module 902.

The second receiving module 901 is configured to receive data and a RRC resume request message from a UE in an RRC inactive state.

The second sending module 902 is configured to send an RRC release message to the UE.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, the data is encapsulated to a first MAC PDU or a second MAC PDU. The first MAC PDU includes a first MAC SDU directly generated through the data. The second MAC PDU includes a second MAC SDU generated by preprocessing the data.

Further, the preprocessing includes at least one of a resume processing, an encryption processing or a segmentation processing of a signaling bearer and a data bearer.

Further, the first MAC SDU includes at least one of LCID information or bearer identification information. The LCID information is configured to indicate a logical channel type of the data, and the bearer identification information is configured to indicate a data bearer corresponding to the data.

Or,

A sub-header of the second MAC SDU includes the LCID information.

Further, the sub-header of the first MAC SDU includes a logical channel identification having LCID information dedicated to IP data.

Further, the first network side device 900 may further include a third sending module, which is configured to send restored data to a core network.

Further, the first network side device 900 may further include a fourth sending module, a third receiving module and a fifth sending module.

The fourth sending module is configured to send a retrieval UE context request message to a second base station.

The third receiving module is configured to receive a retrieval UE context response message from the second base station.

The fifth sending module is configured to send the data to the core network.

Further, the fifth sending module is configured to obtain the data from the first MAC PDU or the second MAC PDU sent by the UE according to a successfully retrieved UE context. The first MAC PDU includes a first MAC SUD directly generated through the data, and the second MAC PDU includes a second MAC SDU generated through a preprocessing using the data. The fifth sending module is also configured to send the data to the core network.

Further, the first network side device 900 may further include a sixth sending module, which is configured to send the retrieval UE context request message to the second base station. The retrieval UE context request message carries at least one of an RRC resume cause indication, a data transmission indication, subsequent data transmission indication information, UE buffer information, the data sent by the UE, LCD information of the data or bearer identification information of the data.

The fourth receiving module is configured to receive a retrieval UE context failure message from the second base station.

Further, the first network side device 900 may further include a fifth receiving module and a seventh sending module.

The fifth receiving module is configured to receive data forwarding information carried by an address indication message or the retrieval UE context failure message from the second base station.

The seventh sending module is configured to forward the data sent by the UE to the second base station.

Further, the data sent by the UE is at least one of the IP data, a first MAC PDU data, a first MAC SDU data, a second MAC PDU data, a second MAC SDU data, a restored first RLC SDU and a restored second RLC SDU.

Further, the RRC resume cause indication includes at least one of an emergency call, a high priority access, a UE termination access, a UE triggered signaling, UE triggered data, a UE triggered voice call or a UE triggered video call.

The first network side device 900 can implement the processes implemented by the first base station or the CU of the first base station or the DU of the first base station in the method embodiments illustrated in FIG. 3 and can achieve the same technical effect, which would not be described here to avoid repetition.

Figure 11:
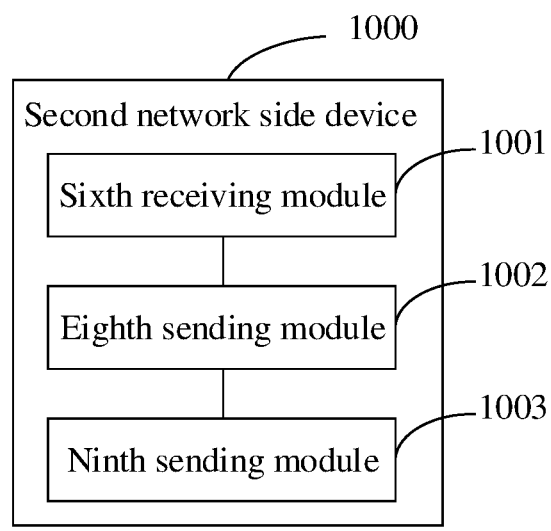

Referring to FIG. 11, FIG. 11 is a structural diagram of a network side device according to an embodiment of the present disclosure. As illustrated in FIG. 11, a second network side device 1000 includes a sixth receiving module 1001, an eighth sending module 1002 and a ninth sending module 1003.

The sixth receiving module 1001 is configured to receive a retrieval UE context request message from a first base station or a CU of the first base station.

The eighth sending module 1002 is configured to send a retrieval UE context failure message to the first base station or the CU of the first base station.

The ninth sending module 1003 is configured to send the data to a core network.

Further, the retrieval UE context request message carries at least one of an RRC resume cause indication, a data transmission indication, subsequent data transmission indication information, UE buffer information, the data sent by the UE, LCD information of the data or bearer identification information of the data.

Further, the second network side device 1000 may further include a seventh receiving module.

The seventh receiving module is configured to receive the data sent by the first base station or the CU of the first base station according to the data forwarding information.

Further, the second network side device 1000 may further include a tenth sending module and an eighth receiving module.

The tenth sending module is configured to send an address indication message carrying the data forwarding information to the first base station or the CU of the first base station.

The eighth receiving module is configured to receive the data sent by the first base station or the CU of the first base station according to the data forwarding information.

The second network side device 1000 can implement the processes implemented by the second base station in the method embodiment illustrated in FIG. 4 and can achieve the same technical effect, which would not be described here to avoid repetition.

Figure 12:
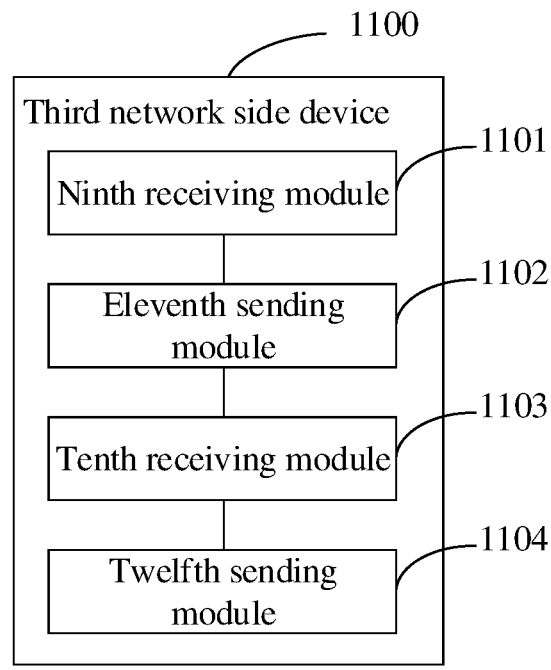

Referring to FIG. 12, FIG. 12 is a structural diagram of a network side device according to an embodiment of the present disclosure. As illustrated in FIG. 12, a third network side device 1100 is a DU of a first base station. The third network side device 1100 includes a ninth receiving module 1101, an eleventh sending module 1102, a tenth receiving module 1103 and a twelfth sending module 1104.

The ninth receiving module 1101 is configured to receive data and an RRC resume request message from a UE in an RRC inactive state.

The eleventh sending module 1102 is configured to send the data and the RRC resume request message to a CU of the first base station.

The tenth receiving module 1103 is configured to receive an RRC release message sent by the CU of the first base station.

The twelfth sending module 1104 is configured to send the RRC release message to the UE.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, the data is encapsulated to a first MAC PDU or a second MAC PDU. The first MAC PDU includes a first MAC SDU directly generated through the data. The second MAC PDU includes a second MAC SDU generated by preprocessing the data.

Further, the preprocessing includes at least one of a resume processing, an encryption processing or a segmentation processing of a signaling bearer and a data bearer.

Further, a sub-header of the first MAC SDU includes at least one of LCID information or bearer identification information. The LCID information is configured to indicate a logical channel type of the data, and the bearer identification information is configured to indicate a data bearer corresponding to the data.

Or,

The sub-header of the second MAC SDU includes the LCID information.

Further, the sub-header of the first MAC SDU includes a logical channel identification having LCID information dedicated to IP data.

Further, the eleventh sending module 1102 may further include a sending submodule.

The sending submodule is configured to send the data to the CU through an initial RRC transfer message or through a user plane interface between the CU and the DU.

Further, the sending submodule is configured to receive a UE context establishment request message carrying transport network layer information from the CU.

The sending submodule is configured to send the data to the CU according to the transport network layer information.

Further, the third network side device 1100 may further include an eleventh receiving module.

The eleventh receiving module is configured to receive BSR information from the UE and send the BSR information to the CU of the first base station.

The third network side device 1100 can implement the processes implemented by the DU of the first base station in the method embodiment illustrated in FIG. 5 and can achieve the same technical effect, which would not be described here to avoid repetition.

Figure 13:
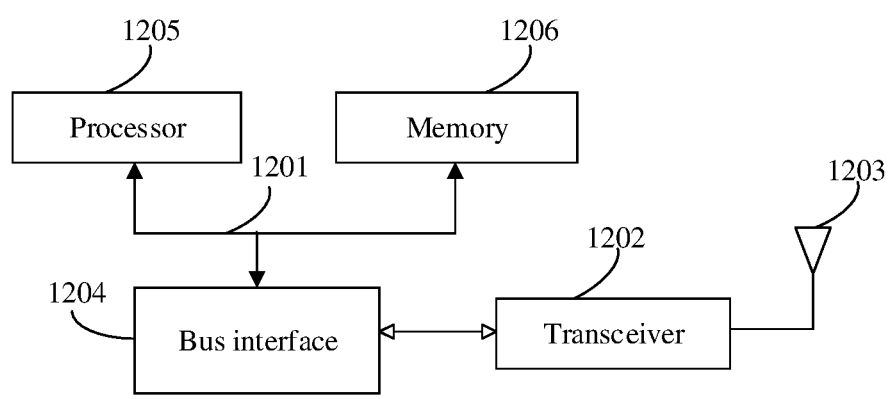

Referring to FIG. 13, FIG. 13 is a structural diagram of a network side device according to an embodiment of the present disclosure. As illustrated in FIG. 13, a bus 1201, a transceiver 1202, an antenna 1203, a bus interface 1204, a processor 1205 and a memory 1206 are included.

In an embodiment of the present disclosure, the network side device is a first base station or a CU of the first base station or a DU of the first base station. The transceiver 1202 is configured to receive data and an RRC resume request message from a UE in an RRC inactive state, and send an RRC release message to the UE.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, the data is encapsulated to a first MAC PDU or a second MAC PDU. The first MAC PDU includes a first MAC SDU directly generated through the data. The second MAC PDU includes a second MAC SDU generated by preprocessing the data.

Further, the preprocessing includes at least one of a resume processing, an encryption processing or a segmentation processing of a signaling bearer and a data bearer.

Further, the first MAC SDU includes at least one of LCID information or bearer identification information. The LCID information is configured to indicate a logical channel type of the data, and the bearer identification information is configured to indicate a data bearer corresponding to the data.

Or,

A sub-header of the second MAC SDU includes the LCID information.

Further, the sub-header of the first MAC SDU includes a logical channel identification having LCID information dedicated to IP data.

Further, the transceiver 1202 is further configured to send restored data to a core network.

Further, the transceiver 1202 is further configured to send a retrieval UE context request message to a second base station.

The transceiver 1202 is configured to receive a retrieval UE context response message from the second base station.

The transceiver 1202 is configured to send the data to the core network.

Further, the transceiver 1202 is also configured to obtain the data from the first MAC PDU or the second MAC PDU sent by the UE according to a successfully retrieved UE context. The first MAC PDU includes a first MAC SUD directly generated through the data, and the second MAC PDU includes a second MAC SDU generated through a preprocessing using the data.

The transceiver 1202 is also configured to send the data to the core network.

Further, the transceiver 1202 is also configured to send the retrieval UE context request message to the second base station. The retrieval UE context request message carries at least one of an RRC resume cause indication, a data transmission indication, subsequent data transmission indication information, UE buffer information, the data sent by the UE, LCD information of the data or bearer identification information of the data The transceiver 1202 is also configured to receive a retrieval UE context failure message from the second base station.

Further, the transceiver 1202 is also configured to receive data forwarding information carried by an address indication message or the retrieval UE context failure message from the second base station.

The transceiver 1202 is also configured to forward the data sent by the UE to the second base station.

Further, the data sent by the UE is at least one of the IP data, a first MAC PDU data, a first MAC SDU data, a second MAC PDU data, a second MAC SDU data, a restored first RLC SDU and a restored second RLC SDU.

Further, the RRC resume cause indication includes at least one of an emergency call, a high priority access, a UE termination access, a UE triggered signaling, UE triggered data, a UE triggered voice call or a UE triggered video call.

The device in the embodiment may implement the processes implemented by the first base station or the CU of the first base station or the DU of the first base station in the embodiment illustrated in FIG. 3 to achieve the same technical effect, which would not be described here.

In another embodiment of the present disclosure, the network side device is a second base station. The transceiver 1202 is configured to receive a retrieval UE context request message from a first base station or a CU of the first base station, send a retrieval UE context failure message to the first base station or the CU of the first base station, and send data to a core network.

Further, the retrieval UE context request message carries at least one of an RRC resume cause indication, a data transmission indication, subsequent data transmission indication information, UE buffer information, the data sent by the UE, LCD information of the data or bearer identification information of the data.

Further, the transceiver 1202 is also configured to receive the data sent by the first base station or the CU of the first base station according to data forwarding information.

Further, the transceiver 1202 is also configured to send an address indication message carrying the data forwarding information to the first base station or the CU of the first base station, and receive the data from the first base station or the CU of the first base station according to the data forwarding information.

The device in the embodiment may implement the processes implemented by the second base station in the embodiment illustrated in FIG. 4 to achieve the same technical effect, which would not be described here.

In yet another embodiment of the present disclosure, the network side device is a DU of a first base station. The transceiver 1202 is configured to receive data and an RRC resume request message from a UE in an RRC inactive state, send the data and the RRC resume request message to a CU of the first base station, receive an RRC release message from the CU of the first base station, and send the RRC release message to the UE.

Further, the RRC resume request message is an RRC resume request message in a four-step random access procedure or an RRC resume request message carried by a MSG A in a two-step random access procedure.

Further, the data is multiplexed or concatenated with the RRC resume request message.

Further, the data is encapsulated to a first MAC PDU or a second MAC PDU. The first MAC PDU includes a first MAC SDU directly generated through the data. The second MAC PDU includes a second MAC SDU generated by preprocessing the data Further, the preprocessing includes at least one of a resume processing, an encryption processing or a segmentation processing of a signaling bearer and a data bearer.

Further, a sub-header of the first MAC SDU includes at least one of LCID information or bearer identification information. The LCID information is configured to indicate a logical channel type of the data, and the bearer identification information is configured to indicate a data bearer corresponding to the data.

Or,

The sub-header of the second MAC SDU includes the LCID information.

Further, the sub-header of the first MAC SDU includes a logical channel identification having LCID information dedicated to IP data.

Further, the transceiver 1202 is also configured to sending the data to the CU through an initial RRC transfer message or through a user plane interface between the CU and the DU.

Further, the transceiver 1202 is also configured to receive a UE context establishment request message carrying transport network layer information from the CU and send the data to the CU according to the transport network layer information.

Further, the transceiver 1202 is also configured to receive BSR information from the UE and send the BSR information to the CU of the first base station.

The device in the embodiment may implement the processes implemented by the DU of the first base station in the embodiment illustrated in FIG. 5 to achieve the same technical effect, which would not be described here.

In FIG. 12, a bus architecture (represented by a bus 1201) may include any number of interconnected buses and bridges. The bus 1201 links one or more processors represented by the processor 1205 with various circuits of the memory represented by the memory 1206. The bus 1201 may also link various other circuits, such as a peripheral device, a voltage regulator and a power management circuit, which are well known in the related art, and would not be further described in the disclosure. The bus interface 1204 provides an interface between the bus 1201 and the transceiver 1202. The transceiver 1202 may be an element or multiple elements, such as multiple receivers and transmitters, and may provide a unit for communicating with various other apparatuses over a transmission medium. Data processed by the processor 1205 is transmitted on a wireless medium through the antenna 1203. Further, the antenna 1203 also receives the data and transmits the data to the processor 1205.

The processor 1205 is responsible for managing the bus 1201 and general processing, and may also provide various functions, including timing, peripheral interface, voltage regulation, power management and other control functions. The memory 1206 may be used to store data used by the processor 1205 when executing an operation.

Optionally, the processor 1205 may be a Central Processing Unit (CPU), an Application Specific Integrated Circuit (ASIC), a Field Programmable Gate Array (FPGA) or a Complex Programmable Logic Device (CPLD).

Optionally, embodiments of the present disclosure further provide a network side device, including the processor 1205, the memory 1206 and the computer program stored on the memory 1206 and being executable on the processor 1205. The computer program, when executed by the processor 1205, implements the processes of the data transmission method illustrated in FIG. 3, or the computer program, when executed by the processor 1205, implements the processes of the data transmission method illustrated in FIG. 4, or the computer program, when executed by the processor 1205, implements the processes of the data transmission method illustrated in FIG. 5, which can achieve the same technical effect, and would not be described here to avoid repetition.

Embodiments of the present disclosure further provide a computer readable storage medium. A computer program is stored on the computer readable storage medium. The computer program, when executed by the processor, implements the operations of the data transmission method illustrated in FIG. 1, or the computer program, when executed by the processor, implements the operations of the data transmission method illustrated in FIG. 3, or the computer program, when executed by the processor, implements the operations of the data transmission method illustrated in FIG. 4, or the computer program, when executed by the processor, implements the operations of the data transmission method illustrated in FIG. 5.

The computer readable storage media is such as a Read Only Memory (ROM), an RA Memory (RAM), a magnetic disk or an optical disk, etc.

It is to be understood that the embodiments described in the disclosure may be implemented by hardware, software, firmware, middleware, a microcode, or a combination thereof. For hardware implementation, modules, units, sub-modules, sub-units, etc. may be implemented in one or more Application Specific Integrated Circuits (ASICs), Digital Signal Processing (DSP), DSP Devices (DSPDs), Programmable Logic Devices (PLDs), Field-Programmable Gate Arrays (FPGAs), general-purpose processors, controllers, microcontrollers, microprocessors, other electronic units for executing the functions described in the disclosure, or a combination thereof.

It is to be noted that terms "include" and "contain" or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Without further restrictions, the element defined by the statement "including a . . . " does not exclude the existence of another same element in the process, method, article or device including the element.

Through the description of the above embodiments, those skilled in the art can clearly understand that methods in the above embodiments can be realized by means of software and necessary general hardware platforms, and can also be realized by hardware, but in many cases, the former is a better implementation. Based on this understanding, the technical solution of the present disclosure essentially or the part that contributes to the related art can be embodied in the form of a software product. The computer software product is stored in a storage medium (such as a ROM/RAM, a magnetic disc and a compact disc), including several instructions to make a UE device (which may be a mobile phone, a computer, a server, an air conditioner or a network device, etc.) to execute the methods described in various embodiments of the present disclosure.

The embodiments of the present disclosure are described above with reference to the accompanying drawings, but the disclosure is not limited to the above-mentioned specific implementations. The specific implementations are only illustrative rather than restrictive. Inspired by the disclosure, a person of ordinary skill in the art can still derive multiple variations without departing from the essence of the present disclosure and the protection scope of the claims. All these variations shall fall within the protection of the present disclosure.

What is claimed is:

1. A data transmission method, applied to a User Equipment (UE) in a Radio Resource Control (RRC) inactive state, the data transmission method comprising:
sending data and an RRC resume request message to a first base station or a Centralized Unit (CU) of the first base station or a Distributed Unit (DU) of the first base station; and
receiving an RRC release message from the first base station or the CU of the first base station or the DU of the first base station;
wherein before sending the data and the RRC resume request message to the first base station or the CU of the first base station or the DU of the first base station, the method further comprises:
encapsulating the data directly as a first Media Access Control (MAC) Service Data Unit (SDU) to a first MAC Protocol Data Unit (PDU);
wherein a sub-header of the first MAC SDU comprises Logical Channel Identification (LCID) information and bearer identification information, the LCID information is configured to indicate a logical channel type of the data, and the bearer identification information is configured to indicate a data bearer corresponding to the data.

2. The data transmission method according to claim 1, wherein the RRC resume request message is an RRC resume request message in a four-step random access procedure or an RRC resume request message carried by a message A (MSG A) in a two-step random access procedure.

3. A data transmission method, applied to a first base station or a Centralized Unit (CU) of the first base station or a Distributed Unit (DU) of the first base station, the data transmission method comprising:
receiving data and a Radio Resource Control (RRC) resume request message from a User Equipment (UE) in an RRC inactive state; and
sending an RRC release message to the UE;
wherein after receiving the data and the RRC resume request message from the UE in the RRC inactive state, the method further comprises:
sending a retrieval UE context request message to a second base station;
wherein the retrieval UE context request message carries at least one of a data transmission indication, or subsequent data transmission indication information.

4. The data transmission method according to claim 3, wherein the RRC resume request message is an RRC resume request message in a four-step random access procedure or an RRC resume request message carried by a message A (MSG A) in a two-step random access procedure.

5. The data transmission method according to claim 3, wherein the data is encapsulated to a first Media Access Control (MAC) Protocol Data Unit (PDU) or a second MAC PDU, the first MAC PDU comprising a first MAC Service Data Unit (SDU) directly generated through the data, and the second MAC PDU comprising a second MAC SDU generated through a preprocessing using the data.

6. The data transmission method according to claim 5, wherein the first MAC SDU comprises at least one of Logical Channel Identification (LCID) information or bearer identification information, the LCID information is configured to indicate a logical channel type of the data, and the bearer identification information is configured to indicate a data bearer corresponding to the data; or
wherein a sub-header of the second MAC SDU comprises the LCID information.

7. The data transmission method according to claim 3, wherein after sending the retrieval UE context request message to the second base station, the method further comprises:
receiving a retrieval UE context response message from the second base station; and
sending the data to the core network.

8. The data transmission method according to claim 7, wherein sending the data to the core network comprises:
obtaining, according to a successfully retrieved UE context, the data from the first Media Access Control (MAC) Protocol Data Unit (PDU) or the second MAC PDU sent by the UE, the first MAC PDU comprising a first MAC Service Data Unit (SDU) directly generated through the data, and the second MAC PDU comprising a second MAC SDU generated through a preprocessing using the data; and
sending the data to the core network.

9. The data transmission method according to claim 3, wherein after sending a retrieval UE context request message to a second base station, the method further comprises:
receiving a retrieval UE context failure message from the second base station; wherein the retrieval UE context request message further carries at least one of an RRC resume cause indication, UE buffer information, the data sent by the UE, Logical Channel Identification (LCID) information of the data or bearer identification information of the data.

10. The data transmission method according to claim 9, further comprising:
receiving data forwarding information carried by an address indication message or the retrieval UE context failure message from the second base station; and
forwarding the data sent by the UE to the second base station.

11. A data transmission method, applied to a second base station, the data transmission method comprising:
receiving a retrieval User Equipment (UE) context request message from a first base station or a Centralized Unit (CU) of the first base station, wherein the retrieval UE context request message carries at least one of a data transmission indication, subsequent data transmission indication information;
sending a retrieval UE context failure message to the first base station or the CU of the first base station; and
sending data to a core network.

12. The data transmission method according to claim 11, wherein the retrieval UE context request message further carries at least one of a Radio Resource Control (RRC) resume cause indication, UE buffer information, data from a UE, Logical Channel Identification (LCID) information of the data or bearer identification information of the data.

13. The data transmission method according to claim 11, wherein the retrieval UE context failure message carries data forwarding information,
wherein the data transmission method further comprises:
receiving the data sent by the first base station or the CU of the first base station according to the data forwarding information; or
sending an address indication message carrying data forwarding information to the first base station or the CU of the first base station, and receiving the data sent by the first base station or the CU of the first base station according to the data forwarding information.

14. The data transmission method according to claim 3, wherein the retrieval UE context request message further carries at least one of an RRC resume cause indication, UE buffer information, the data sent by the UE, Logical Channel Identification (LCID) information of the data or bearer identification information of the data.

* * * * *